(12) United States Patent
Hino et al.

(10) Patent No.: US 8,217,117 B2
(45) Date of Patent: Jul. 10, 2012

(54) OPTICAL FILM

(75) Inventors: Kyoko Hino, Tokyo (JP); Hiroaki Takahata, Ichihara (JP); Ayako Yada, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 63 days.

(21) Appl. No.: 12/679,232

(22) PCT Filed: Sep. 18, 2008

(86) PCT No.: PCT/JP2008/066879
§ 371 (c)(1),
(2), (4) Date: May 18, 2010

(87) PCT Pub. No.: WO2009/038142
PCT Pub. Date: Mar. 26, 2009

(65) Prior Publication Data
US 2010/0222517 A1 Sep. 2, 2010

(30) Foreign Application Priority Data
Sep. 21, 2007 (JP) .................. P2007-245037

(51) Int. Cl.
*C08F 8/00* (2006.01)
*C08L 27/04* (2006.01)
*C08L 27/10* (2006.01)
(52) U.S. Cl. ........................ 525/191; 525/240
(58) Field of Classification Search .................. 525/191, 525/240
See application file for complete search history.

(56) References Cited

U.S. PATENT DOCUMENTS
7,893,161 B2 * 2/2011 Chang et al. .................. 525/191

FOREIGN PATENT DOCUMENTS
| JP | 60-24502 A | 2/1985 |
| JP | 3-021902 A | 1/1991 |
| JP | 2005-325194 A | 11/2005 |
| JP | 2006-028347 A | 2/2006 |
| JP | 2007-063396 A | 3/2007 |
| JP | 2007-321084 A | 12/2007 |

* cited by examiner

*Primary Examiner* — Nathan M Nutter
(74) *Attorney, Agent, or Firm* — Sughrue Mion, PLLC

(57) ABSTRACT

An optical film having at least one layer formed of a polyolefin based resin composition containing 8 to 30 wt % of a component (A) defined below and 92 to 70 wt % of a component (B) defined below, with the proviso that the total of the component (A) and the component (B) is 100 wt %:

component (A): an olefin based polymer with which neither a crystal fusion peak having a crystal fusion heat of 30 J/g or more nor a crystallization peak having a crystallization heat of 30 J/g or more to be observed in the range of −50 to 200° C. is observed in a differential scanning calorimetry measurement according to JIS K 7122; and component (B): a propylene based polymer with which a crystal fusion peak having a crystal fusion heat larger than 30 J/g or a crystallization peak having a crystallization heat larger than 30 J/g to be observed in the range of −50 to 200° C. is observed in a differential scanning calorimetry measurement according to JIS K 7122.

8 Claims, 6 Drawing Sheets

OPTICAL FILM

TECHNICAL FIELD

The present invention relates to an optical film inexpensive and excellent in optical homogeneity and transparency.

BACKGROUND ART

In liquid crystal display devices used in mobile phones and liquid crystal televisions, optical films including a retardation film are used to compensate for optical distortion due to optical anisotropy of a liquid crystal and dependency of chromatic display upon the viewing direction.

As the materials for these optical films, for example, a synthetic resin such as a polycarbonate resin and a cyclic olefin polymer is used; however, these synthetic resins are expensive. As an optical film formed of an inexpensive resin, a retardation film formed of a propylene-ethylene copolymer film is known as described, for example, in Patent Document 1.

Patent Document 1: Japanese Patent Application Laid-Open No. 60-24502

DISCLOSURE OF THE INVENTION

However, a propylene-ethylene copolymer film as described in Patent Document 1 has a problem such as a large variation of phase difference and poor optical homogeneity and transparency, and thus further improvement has been desired.

In the circumstances, a problem to be solved by the present invention, that is, an object of the invention, is to provide an optical film inexpensive and excellent in optical homogeneity and transparency.

More specifically, according to the present invention, there is provided an optical film containing at least one layer formed of a polyolefin based resin composition containing 8 to 30 wt % of a component (A) defined below and 92 to 72 wt % of a component (B) defined below, with the proviso that the total amount of the component (A) and the component (B) is 100 wt %:

component (A): an olefin based polymer with which neither a crystal fusion peak having a crystal fusion heat of 30 J/g or more nor a crystallization peak having a crystallization heat of 30 J/g or more to be observed in the range of −50 to 200° C. is observed in a differential scanning calorimetry measurement according to JIS K 7122; and component (B): a propylene based polymer with which a crystal fusion peak having a crystal fusion heat larger than 30 J/g or a crystallization peak having a crystallization heat larger than 30 J/g to be observed in the range of −50 to 200° C. is observed in a differential scanning calorimetry measurement according to JIS K 7122.

Effect of the Invention

According to the present invention, an optical film inexpensive and excellent in optical homogeneity and transparency is provided.

BRIEF DESCRIPTION OF THE DRAWINGS

FIG. 6(a) shows a sectional view of the nozzle of the tenter-type transverse stretching machine used in Example 4 and FIG. 6(b) shows a sectional view of the nozzle of the tenter-type transverse stretching machine used in Example 5 (FIG. 6(b)).

BEST MODES FOR CARRYING OUT THE INVENTION

Figure 1:
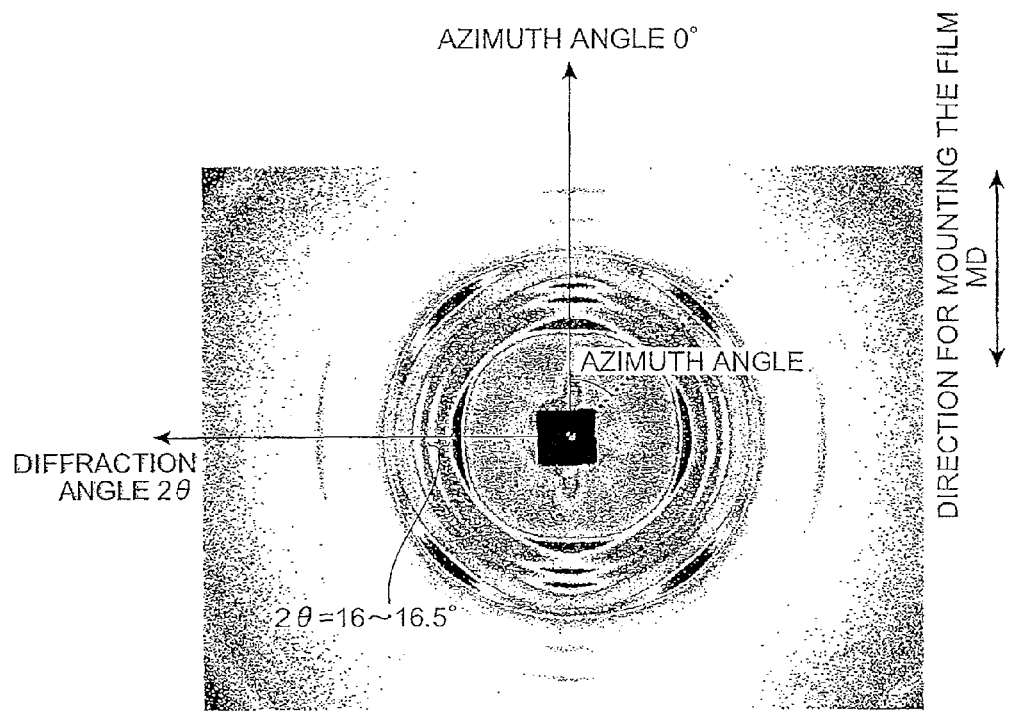
FIG. 1 is a diagram showing a wide-angle X-ray diffraction image of an optical film taken by the through view method, a diffraction angle, an azimuth angle and a direction of mounting the film.

A polyolefin based resin composition according to the present invention contains a component (A) and a component (B) each defined below. The component (A) is an olefin based polymer with which neither a crystal fusion peak having a crystal fusion heat of 30 J/g or more nor a crystallization peak having a crystallization heat of 30 J/g or more to be observed in the range of −50 to 200° C. is observed in a differential scanning calorimetry measurement according to JIS K 7122. This polymer is herein referred to as an amorphous or low crystalline olefin based polymer. In view of improving the transparency of a resultant optical film, the component (A) is preferably an olefin based polymer with which neither a crystal fusion peak having a crystal fusion heat of 1 J/g or more nor a crystallization peak having a crystallization heat of 1 J/g or more to be observed in the range of −50 to 200° C. is observed in a differential scanning calorimetry measurement according to JIS K 7122. This polymer is herein referred to an amorphous olefin based polymer, which is distinguished from a low crystalline olefin based polymer.

The amorphous or low crystalline olefin based polymer being the component (A) of the present invention is, in view of improving the transparency of a resultant film, preferably a polymer satisfying the expression (1) given below.

$$0 \leq [x/(x+y)] < 0.6 \quad (1)$$

(in the above formula (1), x represents the content (% by mole) of a monomer unit derived from ethylene in the component (A), and y represents the content (% by mole) of a monomer unit derived from an α-olefin having 4 to 20 carbon atoms in the component (A), with the proviso that the total content of the component (A) is 100% by mole).

The molecular weight distribution of an amorphous or low crystalline olefin based polymer being the component (A) of the present invention is preferably 1 to 4, and more preferably 1.5 to 3, in view of improving transparency of the resultant optical film. The molecular weight distribution is a ratio (Mw/Mn) of the weight average molecular weight (Mw) to the number average molecular weight (Mn), and it is measured by gel permeation chromatography (GPC) using standard polystyrenes as molecular-weight reference substances.

The intrinsic viscosity [η] of an amorphous or low crystalline olefin based polymer being the component (A) of the present invention measured in a tetralin solvent of 135° C. is preferably 0.01 dl/g or more in view of improving the transparency of a resultant optical film, and preferably 10 dl/g or less and more preferably 0.5 to 5 dl/g, in view of reducing processing defects caused by a torque neck during processing.

Examples of an olefin for use in obtaining an amorphous or low crystalline olefin based polymer being the component (A) of the present invention include ethylene, propylene and an α-olefin having 4 to 20 carbon atoms. Examples of the α-olefin having 4 to 20 carbon atoms include a straight α-olefin such as 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene; and a branched α-olefin such as 3-methyl-1-butene, 3-methyl-1-pentene, 4-methyl-1-pentene, 2-ethyl-1-hexene and 2,2,4-trimethyl-1-pentene.

Examples of the amorphous or low crystalline olefin based polymer being the component (A) of the present invention include an ethylene-propylene copolymer, an ethylene-1-butene copolymer, an ethylene-1-hexene copolymer, an ethylene-1-octene copolymer, an ethylene-1-heptene copolymer, an ethylene-1-octene copolymer, an ethylene-1-nonene copolymer, an ethylene-1-decene copolymer, an ethylene-1-undecene copolymer, an ethylene-1-dodecene copolymer, an ethylene-1-tridecene copolymer, an ethylene-1-tetradecene copolymer, an ethylene-1-pentadecene copolymer, an ethylene-1-hexadecene copolymer, an ethylene-1-heptadecene copolymer, an ethylene-1-octadecene copolymer, an ethylene-1-nonadecene copolymer, an ethylene-1-eicosene copolymer, a propylene-1-butene copolymer, a propylene-1-hexene copolymer, a propylene-1-octene copolymer, a propylene-1-heptene copolymer, a propylene-1-octene copolymer, a propylene-1-nonene copolymer, a propylene-1-decene copolymer, a propylene-1-undecene copolymer, a propylene-1-dodecene copolymer, a propylene-1-tridecene copolymer, a propylene-1-tetradecene copolymer, a propylene-1-pentadecene copolymer, a propylene-1-hexadecene copolymer, a propylene-1-heptadecene copolymer, a propylene-1-octadecene copolymer, a propylene-1-nonadecene copolymer, a propylene-1-eicosene copolymer, an ethylene-propylene-1-butene copolymer, an ethylene-propylene-1-hexene copolymer, an ethylene-propylene-1-octene copolymer and an ethylene-1-butene-1-hexene copolymer. These may be used singly or two or more of them may be used in combination. Preferable examples of the component (A) include a propylene-1-butene copolymer, a propylene-1-hexene copolymer, a propylene-1-octene copolymer, an ethylene-propylene-1-butene copolymer, an ethylene-propylene-1-hexene copolymer and an ethylene-propylene-1-octene copolymer, and further preferable examples include a propylene-1-butene copolymer, an ethylene-propylene-1-butene copolymer. Further preferable examples thereof include a propylene-1-butene copolymer.

The amorphous or low crystalline olefin based polymer being the component (A) of the present invention may contain a monomer unit derived from a monomer except α-olefins. Examples of the monomer except α-olefins include a polyene compound, a cyclic olefin and a vinyl aromatic compound. The content of the monomer unit derived from a monomer except α-olefins is preferably not more than 20% by mole where the total amount of component (A) is 100% by mole.

Examples of the polyene compound being a monomer except an α-olefin include a conjugated polyene compound and a non-conjugated polyene compound. Examples of the conjugated polyene compound include an aliphatic conjugated polyene compound and an alicyclic conjugated polyene compound. Examples of the non-conjugated polyene compound include an aliphatic non-conjugated polyene compound, an alicyclic non-conjugated polyene compound and an aromatic non-conjugated polyene compound. These may be substituted with a substituent such as an alkoxy group, an aryl group, an aryloxy group, an aralkyl group and an aralkyloxy group.

Examples of the cyclic olefin being a monomer except α-olefins include norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydrate, 5-dimethylaminonorbornene, 5-cyanonorbornene, cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene and cycloheptene.

Examples of the vinyl aromatic compound being a monomer except α-olefins include styrene, α-methylstyrene, p-methyl styrene, vinylxylene, monochlorostyrene, dichlorostyrene, monobromostyrene, dibromostyrene, fluorostyrene, p-tert-butylstyrene, ethylstyrene and vinylnaphthalene.

As a method of polymerization to yield an amorphous or low crystalline olefin based polymer being the component (A) of the present invention, a slurry polymerization method, a solution polymerization method, a bulk polymerization method, a vapor phase polymerization method, and so on may be used. The polymer can be produced by polymerizing prescribed monomers using a metallocene catalyst. Examples of the metallocene catalyst include those described in Japanese Patent Laid-Open No. 58-19309, Japanese Patent Application Laid-Open Nos. 60-35005, 60-35006, 60-35007, 60-35008, 61-130314, 3-163088, 4-268307, 9-12790, 9-87313, 11-80233 and National Publication of International Patent Application No. 10-508055. Furthermore, what is particularly preferable as a method for producing an amorphous or low crystalline olefin based polymer using a metallocene catalyst is a production method described in European Patent Application Laid-Open No. 1211287.

Examples of an amorphous or low crystalline olefin based polymer being the component (A) of the present invention include the polymer described in Japanese Patent Application Laid-Open No. 11-193309. Examples of a commercially available product thereof include TAFMER P-series, A-series, XR-series such as XR-110R, XM series such as XM-7070 and XM-7080 and BL series such as BL4000, BL3450 and BL2481 manufactured by Mitsui Chemicals, Inc; DYNARON 6200P manufactured by JSR Corporation; and TAFTHREN T3712, 3722 and 3522, manufactured by Sumitomo Chemical Co., Ltd. Of these, in view of being highly compatible with a component (B) of the present invention and providing a film excellent in transparency, TAF-THREN T3722, T3712 and T3522, manufactured by Sumitomo Chemical Co., Ltd. and TAFMER XM-7070 and XM-7080 manufactured by Mitsui Chemicals, Inc. are preferred.

A component (B) contained in a polyolefin based resin composition according to the present invention is a propylene based polymer having a crystal fusion peak having a crystal fusion heat larger than 30 J/g or a crystallization peak having a crystallization heat larger than 30 J/g to be observed in the range of −50 to 200° C. is observed in a differential scanning calorimetry measurement according to JIS K 7122. This polymer is herein referred to as a crystalline propylene based polymer. Examples of the crystalline propylene based polymer include a propylene homopolymer, a random copolymer of propylene and α-olefin and/or ethylene, a block copolymer of propylene and α-olefin and/or ethylene. In the case where the crystalline propylene based polymer is a random copolymer of propylene and α-olefin and/or ethylene, the content of the monomer units derived from ethylene and an α-olefin having 4 to 20 carbon atoms contained in the random copolymer is not particularly limited; however, the content is preferably 35 mol % or less, and more preferably 24 mol % or less, in view of inhibiting sticking of the crystalline propylene based polymer.

In the case where the crystalline propylene based polymer being a component (B) of the present invention is a random copolymer or block copolymer of propylene and α-olefin and/or ethylene, examples of the α-olefin include a straight α-olefin having 4 to 20 carbon atoms and a branched α-olefin having 4 to 20 carbon atoms. Examples of the straight α-olefin having 4 to 20 carbon atoms include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. Examples of the branched α-olefin having 4 to 20 carbon atoms include 3-methyl-1-butene, 3-methyl-1-pentene, 4-methyl-1-pentene, 2-ethyl-1-hexene and 2,2,4-trimethyl-1-pentene.

Examples of the crystalline propylene based polymer being a component (B) of the present invention include a propylene homopolymer, an ethylene-propylene random copolymer, an ethylene-propylene-1-butene random copolymer, an ethylene-propylene-1-pentene random copolymer, an ethylene-propylene-1-hexene random copolymer, a propylene-1-butene random copolymer, a propylene-1-pentene random copolymer, a propylene-1-hexene random copolymer and an ethylene-propylene block copolymer. Preferable examples of the component (B) include a propylene homopolymer, an ethylene-propylene random copolymer, an ethylene-propylene-1-butene random copolymer and a propylene-1-butene random copolymer.

When the crystalline propylene based polymer being a component (B) of the present invention is a propylene homopolymer, one that is preferred in stereoregularity is a polymer that mainly has an isotactic structure or a syndiotactic structure.

Particularly preferable examples of the crystalline propylene based polymer being a component (B) of the present invention include a propylene-ethylene random copolymer, a propylene-1-butene random copolymer and an ethylene-propylene-1-butene random copolymer. A film obtained by using a polyolefin based resin containing such a propylene based polymer as the component (B) is easily stretched uniformly. Further preferable examples of the component (B) include a crystalline propylene based polymer having a fusion peak temperature (melting point) of a crystal to be observed in the range of −50 to 200° C. is 145° C. or less in the differential scanning calorimetry measurement according to JIS K 7122. Such a crystalline propylene based polymer rarely forms a large spherical crystal (spherocrystal), which causes a reduction of transparency of a film, in an extrusion molding step and a stretching step of a film formation process. Therefore, the resultant film becomes more excellent in transparency. Examples of such a component (B), a propylene-ethylene copolymer having an ethylene-derived monomer unit in an amount of 5.5 mol % or more and 24 mol % or less and a propylene-1-butene copolymer having a 1-buten-derived monomer unit in an amount of 3.0 mol % or more and 20 mol % or less.

Examples of the method for producing a crystalline propylene based polymer being a component (B) a method of homopolymerizing propylene or copolymerizing propylene and an α-olefin and/or ethylene by the use of a Ziegler-Natta type catalyst, a catalyst prepared by using a compound of a transition metal of group IV to VI of the periodical table, or a metallocene catalyst.

Examples of the Ziegler-Natta type catalyst include a catalyst in which a titanium-containing solid transition metal component (solid state) and an organic metal component are used in combination. Examples of the metallocene catalyst include a catalyst prepared by using a compound of a transition metal of group IV to VI of the periodic table having at least one cyclopentadiene type anion skeleton.

Examples of the polymerization method include a slurry polymerization method, a vapor-phase polymerization method, a bulk polymerization method and a solution polymerization method. Furthermore, a single-stage polymerization method using these polymerization methods singly or a multi-stage polymerization method using these polymerization methods in combination are mentioned.

Furthermore, a commercially available propylene based polymer corresponding to the crystalline propylene based polymer of the present invention may be used.

The polyolefin based resin composition constituting the optical film of the present invention contains 8 to 30 wt % of a component (A) and 92 to 70 wt % of a component (B) where the total amount of component (A) and component (B) contained in the composition is 100 wt %. The content of the component (A) and the content of the component (B) in the composition are preferably 10 to 25 wt % and 90 to 75 wt %, respectively. If the content of the component (A) is less than 8 wt %, the resultant optical film sometimes fails to have sufficient optical homogeneity. If the content is larger than 30 wt %, the resultant optical film is low in rigidity and may not be easily handled.

The polyolefin based resin composition to be used in the present invention may contain, if necessary, another resin such as a modified polyolefin based resin, a rosin based resin, a polyterpene based resin, a synthetic petroleum resin, a coumarone based resin, a phenol based resin, a xylene based resin, a styrene based resin and an isoprene based resin as long as it does not undermine the effect of the invention.

Examples of the modified polyolefin based resin include polyolefins modified with a compound for modification, such as maleic anhydride, dimethyl maleate, diethyl maleate, acrylic acid, methacrylic acid, tetrahydrophthalic acid, glycidyl methacrylate and hydroxyethyl methacrylate. The polyolefin based resin to be used herein may be a known polyolefin including an ethylene based resin, an isotactic polypropylene, a syndiotactic polypropylene, a random type polypropylene including a comonomer, a block type polypropylene prepared by multi-stage polymerization, poly(4-methyl-1-pentene) and poly(1-butene).

Examples of the rosin based resin include a natural rosin, a polymerized rosin, a partially hydrogenated rosin, a completely hydrogenated rosin, esterified products of these rosins (for example, glycerin ester, pentaerythritol ester, ethylene glycol ester, methyl ester) and a rosin derivative (for example, disproportionated rosin, fumarated rosin, limed rosin).

Examples of the polyterpene based resin include a homopolymer of a cyclic terpene such as α-pinene, β-pinene and dipentene, a copolymer of a cyclic terpene, a copolymer of a cyclic terpene and a phenol based compound such as phenol and bisphenol (for example, a terpene-phenol based resin such as an α-pinene-phenol resin, a dipentene-phenol resin and a terpene-bisphenol resin) and an aromatic modified terpene resin, which is a copolymer of a cyclic terpene and an aromatic monomer.

Examples of the synthetic petroleum resin include a homopolymer and copolymer of a $C_5$ fraction, a $C_6$ to $C_{11}$ fraction and an olefin based fraction of cracked product of naphtha, a hydrogenated product of these homopolymers and copolymers, namely, an aliphatic petroleum resin, an aromatic petroleum resin, an alicyclic petroleum resin and an aliphatic-alicyclic copolymer. Examples of the synthetic petroleum resin further include copolymers of the cracked products of naphtha and the terpenes mentioned above, and hydrogenated products of the copolymers, that is, copolymer based petroleum resins.

Preferable examples of the $C_5$ fraction of the cracked product of naphtha include methylbutenes, such as isoprene, cyclopentadiene, 1,3-pentadiene, 2-methyl-1-butene and 2-methyl-2-butene, pentenes, such as 1-pentene and 2-pentene, and dicyclopentadiene. Examples of the $C_6$ to $C_{11}$ fraction preferably include methylstyrenes, such as indene, styrene, o-vinyltoluene, m-vinyltoluene, p-vinyltoluene, α-methylstyrene and β-methylstyrene, methylindene, ethylindene, vinylxylene and propenylbenzene. Examples of the olefin based fraction preferably include butene, hexene, heptene, octene, butadiene and octadiene.

Examples of the coumarone based resin include a homopolymer of coumarone or a copolymer of coumarone and indene.

Examples of the phenol based resin include an alkylphenol resin, an alkylphenol-acetylene resin obtained by condensation of an alkyl phenol and acetylene, and modified products of these resins. Such a phenol based resin may be either a novolak type resin obtained by methylolating a phenol with an acid catalyst or a resol type resin obtained by methylolating a phenol with an alkali catalyst.

Examples of the xylene based resin include a xylene-formaldehyde resin formed of m-xylene and formaldehyde and a modified resin obtained by adding a third component to this and reacting them.

Examples of the styrene based resin include a low-molecular-weight polymer of styrene, a copolymer of α-methylstyrene and vinyltoluene, a copolymer of styrene, acrylonitrile and indene, a copolymer of styrene and butadiene, and a copolymer of styrene and ethylenebutylene.

Examples of the isoprene based resin include a resin obtained by copolymerization of a $C_{10}$ alicyclic compound and a $C_{10}$ chain compound.

The polyolefin based resin composition to be used in the present invention may contain, if necessary, a known additive such as an antioxidant, a nucleating agent, a lubricant, an antistatic agent, an anticlouding agent, a pigment and a UV absorber as long as it does not undermine the effect of the invention.

The method for producing a polyolefin based resin composition according to the present invention may be any method by which a component (A) and a component (B) can be homogeneously kneaded, and for example, the following methods (1) and (2) are mentioned.

(1) A method in which a component (A) and a component (B) are previously mixed by a ribbon blender, a Henschel mixer or a tumbler mixer, etc. and the mixture is melted and kneaded, for example, by a single screw extruder or a twin screw extruder.

(2) A method in which a component (A) and part of a component (B) are melted and kneaded to prepare a master batch pellet containing not less than 50 wt % of the component (A), and the master batch is mixed with the remaining component (B) such that components (A) and (B) are contained in the composition in prescribed amounts, in the same manner as in the method (1) and further melted and kneaded.

Examples of the method for forming the master batch pellet containing not less than 50 wt % of an amorphous or low crystalline olefin based polymer being the component (A) include the method described in Japanese Patent Application Laid-Open No. 2000-72923. Furthermore, the master batch pellet containing not less than 50 wt % of an amorphous or low crystalline olefin based polymer being the component (A), if necessary, may be subjected to a treatment such as a sulfur crosslinking treatment, a peroxide crosslinking treatment, peroxide decomposition treatment, a metal ion crosslinking treatment and a silane crosslinking treatment, as long as it does not undermine the effect of the invention. Furthermore, to the surface of the master batch pellet containing not less than 50 wt % of an amorphous or low crystalline olefin based polymer being the component (A), at least one type of powder selected from an antioxidant, calcium carbonate, barium sulfate, silica, talc, stearic acid and polyolefin powders may be dusted, if necessary.

The optical film of the present invention is manufactured by an extrusion molding method. Examples of the extrusion molding method include a method using an extruder, generally used for manufacturing an unstretched film, such as a blown film extrusion method, a T-shaped die method and a calendering method. When an optical film is used, in particular, for a polarizer protecting film, an unstretched film having an extremely small degree of orientation is preferred. Furthermore, when an optical film is used particularly as a retardation film, a uniaxially stretched film can be manufactured by uniaxially stretching the aforementioned unstretched film as a precursor film, in the film-feed direction of a film (machine direction) by a method such as a roll stretching method and a long-span stretching method. Furthermore, if biaxially stretching is required, the manufacture can be performed by stretching a uniaxially stretched film in the width direction (transverse direction) by a method called a tenter method.

The method for manufacturing the optical film of the present invention by extrusion molding will be specifically described. First, the method for manufacturing an unstretched film by extrusion molding a general film formation method like that described above. However, since high transparency, high thickness accuracy, low degree of orientation (phase difference) and homogeneity are required for an optical film, a T-shaped die method is preferably used. The T-shaped die method is a manufacturing process using a T-shaped die cast molding machine, which has an extruder section having a raw material supply unit, an extruder, an adaptor and a T-shaped die; and a take-up section having a cooling roll, a take-up roll and a winder.

The polyolefin based resin composition is loaded from a hopper and melted and kneaded in a cylinder heated to 180° C. or more and 300° C. or less by a screw and extruded from a T-shaped die in the form of a molten sheet. In order to keep an extrusion amount more constant, it is effective to provide a gear pump between the cylinder and the T-shaped die. Furthermore, if a filter unit such as a leaf-disk filter is provided between the cylinder and the T-shaped die, a film less contaminated with foreign matter can be obtained. The temperature which the resin has when being extruded from the T-shaped die in the form of film is 180° C. or more and 300° C. or less, and preferably 220° C. or more and 280° C. or less. The temperature of a resin is measured by a resin thermometer at the lip portion of the T-shaped die. When the resin temperature is less than 180° C., the extensibility of the resin is not sufficient, and the resin fails to extend uniformly in an air-gap and the thickness of the resultant film tends to be irregular. On the other hand, when the resin temperature exceeds 300° C., the quality of a resin deteriorates and a decomposition gas generates. Because of this, the lip portion is smeared and a die line appears. Thus, the appearance of the sheet tends to deteriorate. Furthermore, to inhibit deterioration of a resin, it is preferred that a resin be preparatorily dried in a raw material supply unit before the resin is supplied to an extruder hopper, in an inert gas such as nitrogen at a temperature of 40° C. or more and (Tm-20)° C. or less for about 1 to 10 hours, and then fed to the hopper on the extruder by the same inert gas used in the preparatory drying process. It is also preferred that the extruder hopper be purged with an inert gas such as nitrogen gas and argon gas of 20 to 120° C. The Tm mentioned above is a melting point of a component (B).

The T-shaped die for use in extruding a melted and kneaded polyolefin based resin composition in the form of film preferably has a resin flow channel having no small steps and flaws. Furthermore, the lip portion thereof is preferably plated or coated with a material having a small coefficient of friction with the molten polyolefin based resin composition. Moreover, the tip of the lip is preferably formed into a shape called "sharp edge" by polishing it to a diameter of 0.1 mm ϕ or less. Examples of the material having a small friction coefficient include a specialized plating material such as tungsten carbide base and fluorine base plating materials. When the T-shaped die mentioned above is used, not only occurrence of die drool but also a die line is effectively inhibited, so that the resultant optical film can be improved in appearance. Furthermore, the radius of the rounding of the lip-tip portion of the T-shaped die is preferably 0.05 mm ϕ for the same reason as mentioned above, and more preferably 0.03 mm ϕ. In view of the strength of the lip, the radius of the rounding of the lip-tip potion is preferably 0.01 mm ϕ or more.

The take-up line of a T-shaped die cast molding machine for manufacturing an unstretched film as the optical film of the present invention comprises a cooling roll, a take-up machine and a winder. Particularly, the method of casting onto the cooling roll is important. The method of casting onto the cooling roll includes (1) an air chamber method, (2) a polishing roll method and (3) a soft nip method.

In the air chamber method (1), an instrument constituted of a cooling roll made of metal and an air chamber is used. The air chamber produces air flow, and presses a molten film material against the metal cooling roll to bring the entire surface of the molten film material into contact with it uniformly cooling and solidifying the molten film material. Since it is difficult to bring the edge portions of the molten sheet material into contact with the metal cooling roll stably, the edge portions may be brought into contact with the roll earlier than the center portion by means of electrostatic pinning or an air nozzle. When the metal cooling roll has a mirror finish surface, air may be captured in the space between the molten film material and the metal cooling roll, so that cooling may not be sufficiently performed. Therefore, a metal cooling roll having a satin finished surface, which is called a semi-matte type is preferably used. When a metal cooling roll large in diameter is used, a processing speed can be increased. Therefore, a metal cooling roll having a diameter of 400 mm or more is preferably used. When, for example, a metal cooling roll having 600 mm ϕ is used, the processing speed can be increased generally to about 30 m/min, and at most to about 50 m/min.

In the polishing roll method (2), an instrument having not less than two metal cooling rolls of 200 to 400 mm in diameter is used. Examples of the configuration thereof include cooling roll (1)/cooling roll (2) and cooling roll (1)/cooling roll (2)/cooling roll (3). In these configurations, the cooling roll (1) and the cooling roll (3) are rotated in a direction opposite to that in which the cooling roll (2) rotates. A molten film material extruded from a T-shaped die is nipped and pressed between the cooling roll (1) and the cooling roll (2), thereby being cooled and solidified. The cooling rolls to be used preferably have a mirror finish surface and, to be more specific, preferably has 0.4 S or less.

In the soft nip method (3), as the cooling roll (1) of a polishing roll used in the foregoing (2), a roll having a mirror surface of 0.4 S or less and made of a soft flexible material is used. A molten film material is cooled by nipping it between such a cooling roll (1) and a cooling roll (2) without forming a resin bank and bringing it into contact with the rollers. An endless metal belt may be used in place of the cooling roll (1).

Examples of another method of casting to a cooling roll portion include a method of cooling and solidifying a molten film material by using a polishing roll by and allowing the material to move along the outer surface of the polishing roll without nipping the material between the cooling roll (1) and the cooling roll (2); and an extrusion-lamination processing, which is a kind of a soft nip molding, in which a molten film material is nipped and pressed together with a biaxially stretched polyester film or the like by using a cooling roll (1) and a rubber roll.

Of the methods described above, the air chamber method (1) is preferred when the processing speed is high and the thickness of a film to be produced is 80 μm or less. On the other hand, when the processing speed is 30 mm/min or less, the manufacture by the soft nip method (3) or the extrusion-lamination processing is preferred in view of the transparency and the optical homogeneity of a resultant film.

The distance from the tip of the T-shaped die to a contact portion of a molten film with the metal cooling roll in the case of the air chamber system (1), and the distance from the tip of the T-shaped die to the portion at which a molten film is nipped between the cooling roll (1) and cooling roll (2) and pressed in the cases of the polishing system (2) and the soft nip system (3) are each called an air gap. In the present invention, the air gap is preferably adjusted to be 50 mm or more and 250 mm or less, and more preferably 50 mm or more and 180 mm or less, in view of optical homogeneity of the resultant film. Furthermore, in view of the transparency of a resultant film, the temperature of the cooling roll is preferably 30° C. or less, and more preferably 0 to 20° C. in any one of the casting methods.

The film cooled by the aforementioned method is taken up by a take-up machine, and, if necessary, is examined with respect to the thickness of the film and the number of defects in line, and is laminated with a protecting film, or the like. Usually, the edge portions of the film are slit away and the film is rolled up by a winder.

The thickness of the optical film of the present invention is selected depending upon the intended application thereof. For example, when an unstretched film obtained by extrusion molding is directly used as an optical film, for example, as a polarizer protecting film, the thickness is usually about 10 μm or more and about 120 μm. Furthermore, when the unstretched film is stretched and then used as a retardation film, the thickness of the stretched film is usually 10 μm or more and 120 μm or less. In the latter case, since the thickness of the unstretched film before the stretching is reduced through the stretching, it is adjusted to be about 50 μm or more to about 500 μm in consideration of the thickness of a finished product and a stretching ratio.

The optical film of the present invention may be a single layer film consisting of only a layer formed of a polyolefin based resin composition containing a component (A) and a component (B) or may be a multi-layer film including the aforementioned layer. When the optical film of the present invention is used as a retardation film, a single layer film is preferred from the viewpoint of optical homogeneity. In the case of a multi-layer film, the film may be manufactured either by a coextrusion method or by laminating different films to each other. Alternatively, a layer may be formed on a single layer or multi-layer film by coating. Examples of a resin for forming another layer to be laminated onto the layer of the polyolefin based resin composition containing the component (A) and the component (B) in the multi-layer film include a crystalline propylene based polymer which is the component (B) of the present invention, polyolefin based resin compositions containing the component (A) and the component (B) in various mixing ratios and an ethylene based polymer.

In order to use the optical film of the present invention as a retardation film, it is necessary to stretch the unstretched film obtained by extrusion molding at least in a single direction. Examples of the stretching method include stretching in a film-feed direction of a film (longitudinal stretching), stretching in the width direction of a film (transverse stretching), successive biaxial stretching and simultaneous biaxial stretching. In the case of successive biaxial stretching, it may be carried out either by a method in which longitudinal stretching is performed first and then transverse stretching is performed, or by a method in which transverse stretching is performed first and then longitudinal stretching is performed.

As a method for uniaxially stretching a film in a longitudinal direction, a roll stretching method or a long-span stretching method is mentioned. The roll stretching method is a method in which a film is heated to a temperature at which the film can be stretched by several rollers set to be 100 to 160° C. and then stretched by the action of the rotation velocities of the rolls. This method is characterized in that the rolls are arranged at small intervals. On the other hand, the long-span stretching method is a method carried out by the use of an apparatus having nip rolls provided before and after an oven, wherein a film is heated in the oven up to a stretching temperature and then stretched by the action of the speed ratio of the nip rolls provided before and after the oven. This method is characterized in that the film is usually stretched while exhibiting large neck-in because the interval between the nip rolls is about several meters. The stretching ratio in the longitudinal direction is usually about 1.1 to about 5. As the oven to be used in stretching, an oven whose temperature can be controlled within 0.5° C. is preferred.

The stretching of a film in the transverse direction is performed by a tenter method. The tenter method is a method carried out by stretching a film in its width direction by using an instrument having an oven and a plurality of chucks arranged on respective rails on the left and right sides with respect to the film-travelling direction. The chucks are connected to each other on the respective rails and rotated by a motor on the rails at a processing speed. In this instrument, the unstretched film or the uniaxially stretched film to be stretched in the width direction is stretched by grabbing both ends of the film by chucks, heating it in the oven, and spreading the chucks by the rails so as to obtain a prescribed stretching ratio after the temperature reaches a heating temperature. The stretching ratio of a film in the width direction is usually about 1.1 to about 5. As the oven to be used in stretching, an oven whose temperature can be controlled within 0.5° C. is preferred.

The optical film of the present invention can be used for, for example, a polarizer, a polarizer protecting film, a retardation film, a view angle enlarging film and a brightness improving film to be used for a flat panel display of a liquid crystal display device and the like. Of them, the optical film is suitably used as a polarizer protecting film and a retardation film.

The optical film of the present invention can be used as a part of a liquid crystal display device by, for example, a method in which the optical film is laminated to one side or both sides of a liquid crystal cell or a method in which the optical film laminated on a liquid crystal cell without an adhesive layer interposed therebetween. Furthermore, the optical film of the present invention may have been coated with, for example, a hard coat layer, an antidazzle layer, antireflection layer, a protecting layer, an adhesive layer, an orientation film and a liquid crystal layer.

The retardation film of the present invention is laminated together with various types of polarizing plates and liquid crystal layers, and preferably used as liquid crystal display devices such as mobile phones, personal digital assistants (PDA), personal computers and big-screen televisions. Examples of the liquid crystal display device (LCD) in which the retardation film of the present invention is to be laminated and used include liquid crystal display devices of various modes, such as an optically compensated bend (OCB) mode, a vertical alignment (VA) mode, an in-plane switching (IPS) mode, a thin film transistor (TFT) mode, a twisted nematic (TN) mode and a super twisted nematic (STN) mode. In particular, the retardation film of the present invention is effective in improving the view angle dependency of a liquid crystal display device of the VA mode. The liquid crystal display device is generally designed so that polarizing plates may be arranged on both sides of a liquid crystal cell having two substrates and a liquid crystal layer sandwiched therebetween, and of the beams emitted by a backlight disposed outside (rear-surface side) one of the polarizing plates, only a linear polarized light beam, which is parallel to the transmission axis of the polarizing plate disposed between the liquid crystal cell and the backlight, can enter the liquid crystal cell. Between the rear-surface-side polarizing plate and a liquid crystal cell and/or between the front-surface-side polarizing plate and the liquid crystal cell, an adhesive agent may be arranged. A polarizing plate generally has a configuration in which a polarizing film made of polyvinyl alcohol or the like is sandwiched between two protecting films, such as triacetylcellulose (TAC) films, via an adhesive interposed therebetween in order to protect the polarizing film formed of polyvinyl alcohol; however, the retardation film of the present invention can be laminated to a polarizing film with an adhesive in place of the protecting film(s) located on the liquid crystal cell side of the front side and/or the rear side polarizing plate. If so, the retardation film of the present invention can serve as both an optical compensation film (retardation film) and a protecting film.

(Phase Difference)

The phase difference required for a retardation film varies depending upon the type of the liquid crystal display device to which the retardation film is to be installed, and depending upon the function of the retardation film; however, generally, the in-plane phase difference ($R_0$) is 30 to 300 nm.

The in-plane phase difference required for a retardation film and the phase difference in a the thickness direction described later are generally developed by stretching an unstretched film in which molecules are not oriented in any direction, thereby orienting the molecules. Since a desired phase difference and the direction of a slow axis vary depending upon the type of the liquid crystal display device in which a retardation film is to be installed and upon the function of the retardation film, the stretching method is appropriately selected, according to the phase difference and the direction of the slow axis required for each case, from stretching methods generally employed, such as longitudinal uniaxial stretching, transverse uniaxial stretching, successive biaxially stretching and simultaneous biaxially stretching. Details about each stretching method are as described in the above. A retardation film having a desired phase difference can be obtained by controlling stretching conditions, such as the stretching ratio and the temperature applied during the longitudinal stretching or the transverse stretching in the process of manufacturing the retardation film and by controlling the thickness of the retardation film to be produced.

When a retardation film is used in a vertical alignment (VA) mode liquid crystal display, in view of obtaining excellent view angle characteristics, the film preferably has an in-plane phase difference $R_0$ of 40 to 70 nm and a phase difference in the thickness direction $R_{th}$ of 90 to 230 nm or preferably has an in-plane phase difference $R_0$ of 100 to 160 nm and a phase difference in the thickness direction $R_{th}$ of 50 to 80 nm. As to the stretching method to be used when a retardation film having an in-plane phase difference $R_0$ of 40 to 70 nm and a thickness-direction phase difference $R_{th}$ of 90 to 230 nm is manufactured it is preferable to subject an unstretched film to biaxial stretching in which the long-span stretching method and the tenter method are combined. As to the stretching method to be used when a retardation film having an in-plane phase difference $R_0$ of 100 to 160 nm and a thickness-direction phase difference $R_{th}$ of 50 to 80 nm is manufactured, an unstretched film is preferably uniaxially stretched in the transverse direction by the tenter method or uniaxially stretched in the longitudinal direction by the long-span stretching method. The transverse uniaxial stretching of an unstretched film by the tenter method is particularly preferred because the slow axis of the retardation film becomes in parallel to the film-width direction and a polarizing film can be laminated thereto by a role to roll method.

Furthermore, when an ellipsoidal polarizing plate is formed by combining a retardation film and a polarizing plate and then used for antireflection of, for example, a mobile phone and a personal digital assistant, the retardation film preferably has an in-plane phase difference $R_0$ of 100 to 400 nm and a thickness-direction phase difference $R_{th}$ of 50 to 200 nm. In the case of a retardation film generally called a ¼ wavelength plate, the in-plane phase difference $R_0$ of the film is more preferably 100 to 160 nm and the thickness-direction phase difference $R_{th}$ thereof is more preferably 50 to 80 nm. In the case of a retardation film generally called a ½ wavelength plate, the in-plane phase difference $R_0$ of the film is more preferably 240 to 340 nm and the thickness-direction phase difference $R_{th}$ thereof is more preferably 120 to 170 nm. In this case, as to the stretching method for manufacturing a retardation film, it is preferable that an unstretched film be uniaxially stretched in the transverse direction by the tenter method or that an unstretched film be uniaxially stretched in the longitudinal direction by the long-span stretching method. The transverse uniaxial stretching of an unstretched film by the tenter method is particularly preferred because the slow axis of the retardation film becomes in parallel to the film-width direction and a polarizing film can be laminated thereto by a role to roll method. Furthermore, in view of obtaining excellent view angle characteristics, it is sometimes preferred that a retardation film has an in-plane phase difference $R_0$ of 100 to 160 nm and a thickness-direction phase difference $R_{th}$ of 100 to 200 nm. In this case, as to the stretching method to be used for manufacturing a retardation film, it is preferable to subject an unstretched film to biaxial stretching in which the long-span stretching method and the tenter method are combined.

The in-plane phase difference $R_0$ and the thickness-direction phase difference $R_{th}$ of a film are respectively defined by the following formulas (I) and (II).

$$R_0 = (n_x - n_y) \times d \quad (I)$$

$$R_{th} = \{(n_x + n_y)/2 - n_z\} \times d \quad (II)$$

In the formulas (I) and (II), $n_x$ is a refractive index in the slow axis direction in the film plane (the direction in which the refractive index becomes maximum). In the formulas (I) and (II), $n_y$ is a refractive index in the fast axis direction in the film plane (the direction in which the refractive index becomes minimum). In the formula (II), $n_z$ is a refractive index in the thickness-direction of a film. In the formulas (I) and (II), d is the thickness of a film expressed in the unit "nm".

In the retardation film manufactured by the aforementioned method, the difference between the maximum and the minimum of the phase difference in a film plane (a plane 500 mm in width×500 mm in length) is 10 nm or less. When the angle of an optical axis is measured along with the width direction of 500 mm, the angle of the optical axis is −1° or more and +1° or less and it is possible to obtain a retardation film having high optical homogeneity.

The optical axis as referred to in the present invention means the direction in which the refractive index becomes maximum in the plane of a stretched film, in short, the in-plane slow axis. The angle of the optical axis means the angle formed between the stretching direction of a polymer film and the slow axis of the polymer film, and also called an orientation angle. In the present invention, the angle of the optical axis is defined as the angle formed between the slow axis and a reference line, assuming that the stretching direction of a polymer film is regarded as the reference line (0°). The angle of the optical axis can be measured by using a polarizing microscope or an automatic birefringence meter.

(Degree of Orientation of Crystal)

An optical film of the present invention having been biaxially stretched in the film-feed direction (MD direction) and in the film-width direction (TD) which exhibits maximum peaks at four azimuth angles 0°, 90°, 180° and 270° in a profile (see FIG. 2) showing the dependency of a diffraction peak intensity upon an azimuth angle obtained by plotting the diffraction peak intensity of a wide-angle X-ray diffraction image appearing in a region near 2θ=16 to 16.5° in a wide-angle X-ray diffraction image (see FIG. 1) on the ordinate and an azimuth angle of from 0° to 360° is plotted on the abscissa, where the perpendicular direction with respect to the peak is defined as an azimuth angle of 0°, and which has a presence ratio of crystals oriented in the film-width direction (TD), C, of 0.75 or more and 0.85 or less and a degree of orientation of crystals oriented in the film-width direction (TD), D, of 80% or more and 95% or less is preferably used as a retardation film particularly suitable for the aforementioned vertical-alignment (VA) mode liquid crystal display. The retardation film has an in-plane phase difference $R_0$ of 40 to 70 nm and a thickness-direction phase difference $R_{th}$ of 90 to 230 nm.

An optical film of the present invention which exhibits maximum peaks at two azimuth angles 0° and 180° in a profile (see FIG. 2) showing the dependency of a diffraction peak intensity upon an azimuth angle obtained by plotting the diffraction peak intensity of a wide-angle X-ray diffraction image appearing in a region near 2θ=16 to 16.5° in a wide-angle X-ray diffraction image (see FIG. 1) on the ordinate and an azimuth angle of from 0° to 360° is plotted on the abscissa, where the perpendicular direction with respect to the peak is defined as an azimuth angle of 0°, and which has a presence ratio of crystals oriented in the film-width direction (TD), C, of 0.90 or more and 1.00 or less and a degree of orientation of crystals oriented in the film-width direction (TD), D, of 60% or more and 85% or less is preferably used as a retardation film particularly suitable for the aforementioned vertical alignment (VA) mode liquid crystal display and as a ¼ wavelength plate and a ½ wavelength plate for an ellipsoidal polarizing plate.

The presence ratio of crystals oriented in the film-width direction (TD), C, is defined as follows.

In a profile showing the azimuth angle dependency of a diffraction peak intensity obtained, on the basis of a wide-angle X-ray diffraction image obtained by setting a film in a sample section of a wide-angle X-ray diffractometer so that the film-feed direction (MD) may become in parallel to the vertical direction and then applying X-rays to the film surface (through view measurement), by plotting the diffraction peak intensity of a wide-angle X-ray diffraction image appearing in a region near 2θ=16 to 16.5° in a wide-angle X-ray diffraction image (see FIG. 1) on the ordinate and an azimuth angle of from 0° to 360° is plotted on the abscissa, where the perpendicular direction with respect to the peak is defined as an azimuth angle of 0°, a peak which takes maximum values at azimuth angles of 90° and 270° is a peak derived from a crystal oriented in the film-feed direction (MD), whereas a peak which takes maximum values at azimuth angles of 0° and 180° is a peak derived from a crystal oriented in TD.

More specifically, in a film uniaxially stretched only in the film-feed direction (MD), a peak having maximum values at azimuth angles of 90° and 270° is observed, whereas in a film uniaxially stretched only in the film-width direction (TD), a peak having maximum values at azimuth angles of 0° and 180° is observed. In a film biaxially stretched in the film-feed direction (MD) and the film-width direction (TD), maximum peaks are observed at four azimuth angles of 0°, 90°, 180° and 270°.

The presence ratio of crystals oriented in the film-width direction (TD), C, is defined by the following formula (2):

$$C=((I_0-I\min)+(I_{180}-I\min))/((I_0-I\min)+(I_{180}-I\min)+(I_{90}-I\min)+(I_{270}-I\min)) \quad \text{Formula (2)}$$

where in an azimuth angle range of from 0° to 360°, the minimum value of the diffraction peak intensity is represented by Imin and diffraction peak intensities at azimuth angles of 0°, 90°, 180° and 270° are represented by $I_0$, $I_{90}$, $I_{180}$ and $I_{270}$, respectively.

Furthermore, the degree of orientation of crystals oriented in the film-width direction (TD), D, is defined as follows (see, for example, "X-ray Diffraction Handbook", issued by Rigakudenki Kabushiki-kaisha, 1997, p. 97).

Figure 2:
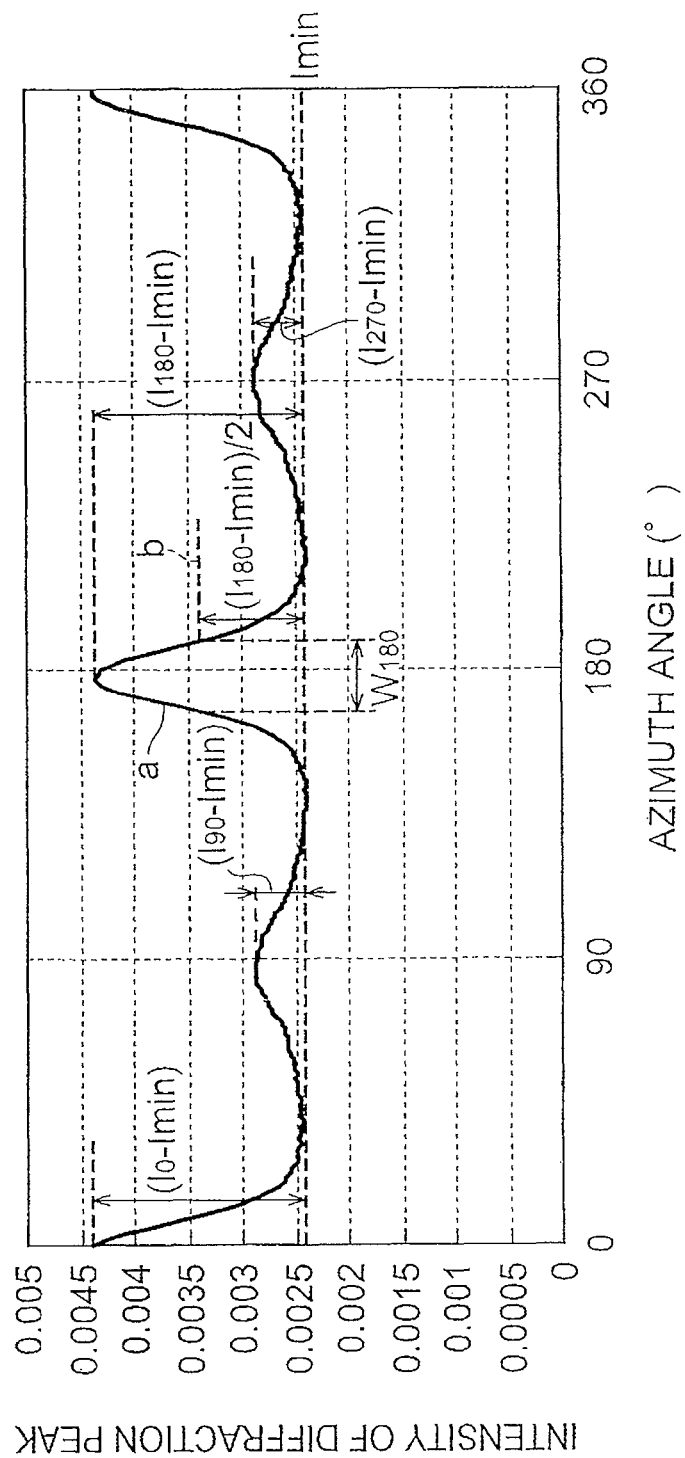
FIG. 2 includes a graph showing the diffraction peak appearing in the region near 2θ=16 to 16.5° versus the azimuth angle based on the wide-angle X-ray diffraction image of FIG. 1, and a diagram for illustrating a maximum peak and the half width of the maximum peak.

First, the half width values of peaks having maximum values at azimuth angles of 0° and 180° are assumed to be $W_0$ and $W_{180}$, respectively (see, FIG. 2). Here, the method of determining a half width will be described referring to FIG. 2 by taking a peak at an azimuth angle of 180° as an example. At peak a having an azimuth angle of 180°, the width of the peak at position b at which the intensity is $(I_{180}-I\min)/2$ is defined as a half width $W_{180}$.

Then, the degree of orientation of crystals oriented in the film-width direction (TD), D, is defined by the following formula (3).

$$D=100\times(360-(W_0+W_{180})/360) \quad \text{Formula (3)}$$

EXAMPLES

The present invention will be more specifically described by way of the following examples.

[I] Measurement Method

Physical properties were measured as follows.

(1) Content (Unit: % by Mole) of a Monomer Unit Derived from 1-Butene Contained in an Amorphous or Low Crystalline Olefin Based Polymer The contents of monomer units of a propylene-1-butene polymer were calculated based on the measurement results of a $^{13}$C-NMR spectrum by a nuclear magnetic resonance apparatus (AC-250 (trade name) manufactured by Bruker). Specifically, from the ratio between the intensity of a methyl carbon spectrum based on a monomer unit derived from propylene of a $^{13}$C-NMR spectrum and the intensity of a methyl carbon spectrum based on a monomer unit derived from 1-butene, the composition ratio of the monomer unit derived from propylene and a monomer unit derived from 1-butene was calculated.

(2) Fusion Heat of a Crystal and Crystallization Peak

Measurement was performed by a differential scanning calorimeter (DSC220C: input compensation DSC, manufactured by Seiko Instruments Inc.) in accordance with JIS K 7122. Specifically, conditions were controlled as follows. The temperature of a sample polymer was increased form room temperature to 200° C. at a rate of 30° C./minute and maintained at 200° C. for 5 minutes. Next, the temperature was decreased at a rate of 10° C./minute to −50° C. and maintained at −50° C. for 5 minutes and thereafter, increased from −50° C. to 200° C. at a rate of 10° C./minute. Then, fusion heat of a crystal and crystallization peak were measured.

(3) Melt Flow Rate (MFR, Unit: G/10 Minutes)

The melt flow rate of master batches containing a component (B) or a component (A) to be contained in the optical film of the present invention were measured in accordance with JIS K 7210 at a test temperature of 230° C. and a test load of 21.18 N.

(4) Molecular Weight Distribution (Mw/Mn)

Measurement was performed by gel permeation chromatography (GPC). As a measurement apparatus, 150C/GPC (manufactured by Waters) was used. As a measurement solvent, o-dichlorobenzene was used. As a column, Sodex Packed Column A-80M (2 columns) manufactured by Showa Denko K.K. were used. As the molecular weight reference substance, a standard polystyrene (molecular weight 68 to 8,400,000 manufactured by Tosoh Corporation) was used. In the conditions (an elution temperature: 140° C., an elution solvent flow rate: 1.0 ml/minute), a solution (400 µl) of a sample polymer (about 5 mg) dissolved in 5 ml of o-dichlorobenzene was injected to measure weight average molecular weight (Mw) and number average molecular weight (Mn) in terms of polystyrene by a differential refractometer. The ratio of them, that is, molecular weight distribution (Mw/Mn), was obtained.

(5) Intrinsic Viscosity ([η], Unit: Dl/G)

Measurement was performed by using Ubbelohde viscometer, at 135° C. in a tetralin solvent. Tetralin solutions containing amorphous olefin based copolymer in a concentration (c) of 0.6, 1.0 and 1.5 mg/ml were prepared. The time of liquid surface of each of the sample solutions passing between marked lines was measured three times. The same measurement was repeated with respect to each concentration three times. An average of three values for each concentration thus obtained was regarded as a specific viscosity ($\eta_{sp}$) at the concentration. Intrinsic viscosity ([η]) was obtained by extrapolating c of $\eta_{sp}/c$ into 0.

(6) Content (Wt %) of a Monomer Unit Derived from Ethylene of Crystalline Propylene Based Polymer The content of a monomer unit derived from ethylene was obtained by IR spectrum measurement performed in accordance with the method regarding (i) random copolymer described in "Polymer Handbook" (issued by KINOKUNIYA Company Ltd. 1995) on page 616.

(7) Optical Homogeneity (in-Plane Phase Difference $R_0$)

Provided that the refractive index in the in-plane slow axis direction of the resultant film is represented by $n_x$, the refractive index in the in-plane fast axis direction (crossed in perpendicular to the slow axis, in-plane) is represented by $n_y$ and thickness is represented by d, the in-plane phase difference value ($R_0$) is defined by the following formula (I).

$$R_0 = (n_x - n_y) \times d \quad (I)$$

The in-plane phase difference value $R_0$ was obtained by measurement using a phase difference measurement apparatus (KOBRA-CCD manufactured by Oji Scientific Instruments). In Examples 1 to 3 and Comparative Examples 1 and 2, a section (400 mm in width) of the produced film obtained by cutting off the right and left edges (160 mm for each) of the film was measured at intervals of 1.5 mm in the width direction, and an average value and a standard deviation were calculated. Variation of phase difference (=standard deviation*100/average value) was evaluated.

When a stretched film is used as a retardation film (Examples 4 to 6 and Comparative Example 3), measurement was performed in the center portion of the resultant film in the width direction, more specifically, in a half of the film width at intervals of 1.5 mm in the width direction. An average value and a standard deviation were obtained by calculation. Variation of phase difference (=standard deviation*100/average value) was evaluated. The smaller the variation of phase difference value, the more excellent optical homogeneity.

(8) Thickness-Direction Phase Difference $R_{Th}$

Thickness-direction phase difference $R_{th}$ was measured in the center portion of a retardation film by use of a phase difference measurement apparatus (KOBRA-WPR manufactured by Oji Scientific Instruments).

(9) Angle of the Optical Axis and Variation Thereof

When a stretched film is used as a retardation film (Examples 4 to 6 and Comparative Example 3), an angle of the optical axis was measured in the center portion of the resultant film in the width direction, more specifically, measured in a half of the film in the width direction by use of a polarizing microscope at intervals of 100 mm. The difference between a maximum value and a minimum value is determined as optical axis variation. The smaller the optical axis variation, the more excellent optical homogeneity.

(10) Measurement of Wide-Angle X-Ray Diffraction

Wide-angle X-ray diffraction of each optical film was measured in the following conditions.

Type of machine RINT2000 manufactured by Rigaku Corporation Bulb Cu
Voltage 50 KV
Current 100 mA
Collimator (beam diameter) 1 mm ϕ
Kβ filter Nickel foil
Detector Imaging plate (manufactured by FUJIFILM Corporation)
Distance from camera 140 mm
Measurement range Diffraction angle (2θ): 5 to 35°

A film was set at the sample section of a wide-angle X-ray diffractometer such that the film-feed direction (MD) is in parallel to the vertical direction and X-rays was applied to the film surface (through view measurement). Based on the diffraction peaks appearing in the range near 2θ of 16 to 16.5° in the resultant wide-angle X-ray diffraction image, the present ratio C of a crystal oriented in the film-width direction (TD) and the degree of orientation D of the crystal oriented in the film-width direction (TD) that can be obtained in accordance with the definition above were separately obtained.

Example 1

[Production of Component (A)]

In a reactor (100 L) made of SUS and equipped with a stirrer, propylene and 1-butene were continuously polymerized using hydrogen as a molecular weight modifier in accordance with the following method to obtain a propylene 1-butene copolymer corresponding to the component (A).

Hexane serving a polymerization solvent at a feed rate of 100 L/hour, propylene at a feed rate of 24.00 kg/hour and 1-butene at a feed rate of 1.81 kg/hour were continuously supplied from the lower portion of the reactor.

Similarly, as a polymerization catalyst, dimethylsilylene (tetra methylcyclopentadienyl)(3-tert-butyl-5-methyl-2-phenoxy)titanium dichloride at a feed rate of 0.005 g/hour, triphenylmethyltetrakis(pentafluorophenyl)borate at a feed rate of 0.298 g/hour and triisobutylaluminum at a feed rate of 2.315 g/hour were continuously fed.

The reaction solution was continuously removed from the upper portion of the reactor such that the volume of the reaction solution in the reactor was constantly maintained at 100 L.

Polymerization reaction was performed at 45° C. by circulating cooling water in a jacket provided outside the reactor.

To the reaction solution continuously removed from the upper portion of the reactor, a small amount of ethanol was added to terminate the polymerization reaction. Thereafter, an unreacted monomer was removed and washing with water was then performed in order to remove a residue of a polymerization catalyst contained in the reaction solution. Finally, the polymerization solvent was removed by steam in a large amount of water to obtain propylene-1-butene copolymer (hereinafter, referred to as polymer (A-1)). This was dried under reduced pressure at 80° C. over a day and night. The content of a monomer unit of polymer (A-1) derived from propylene was 94.5% by mole, and the content of a monomer unit derived from 1-butene was 5.5% by mole. Furthermore, [η] of polymer (A-1) was 2.3 dl/g, and a molecular weight distribution (Mw/Mn) was 2.2 (Mw=420000, Mn=191000). Neither a crystal fusion peak temperature nor a crystallization peak was observed.

[Production 1 of Master Batch of Component (A): Amorphous or Low Crystalline Olefin Based Polymer]

The amorphous propylene-1-butene copolymer (70 parts by weight) produced in the above, 30 parts by weight of a crystalline propylene based polymer (ethylene-propylene random copolymer, MFR=7.0 g/10 minute, Tm=136° C., fusion heat of a crystal=77 J/g, the content of a monomer unit derived from ethylene=7.3 mol %), 0.2 parts by weight of a hindered phenol-based antioxidant ("Irganox1010" manufactured by Ciba Speciality Chemicals) and 0.2 parts by weight of an aromatic phosphite-based antioxidant ("Irgafos168" manufactured by Ciba Speciality Chemicals) were mixed. Next, to the mixture (100.4 parts by weight), 0.3 parts by weight of a peroxide ("Perhexa 25B-8" manufactured by NOF Corporation) was mixed, and melted and kneaded by a double screw extruder at 220° C. The MFR of a master batch (A-1-MB-1) of the resultant component (A) was 6.5 g/10 minutes.

An optical film to be subjected to evaluation for above item (7) was formed in accordance with the following method.
[Formation of Optical Film]

As a component (B), 85 parts by weight of the same ethylene-propylene random copolymer (MFR=7.0 g/10 minutes, Tm=137° C., fusion heat of a crystal=77 J/g, the content of monomer unit derived from ethylene=7.3 mol %) used in the crystalline propylene based polymer of the above master batch (A-1-MB-1) and 15 parts by weight of the master batch (A-1-MB-1) of the component (A) obtained above were blended in the state of pellet and thereafter, extruded by a 45 mm φ double screw extruder at a resin temperature of 230° C. to obtain a raw material pellet (1). The content of the component A in the raw material pellet (1) was 10.5 wt %. The raw material pellet (1) was melted/kneaded by a 50 mm φ extruder adjusted to a temperature of 230° C., extruded from a T-shaped die of 450 mm in width adjusted to a temperature of 250° C. in the form of film and cooled by a cooling roll adjusted to 20° C. The both side-edges of the film were cut off to obtain an unstretched film of 220 mm in width. The thickness of the unstretched film obtained was 120 μm.

The unstretched film was grabbed by chucks at both edges (20 mm for each) and transversely stretched to 4 folds by a method using a tenter having an inlet width of 180 mm at a stretch temperature of 134° C. to obtain a stretched film for use in evaluation having a width of 720 mm. The resultant stretched film had no problem in drawing out from a roll of the film and was satisfactorily handled. The evaluation results are shown in Table 1. The resultant stretched film was subjected to wide-angle X-ray diffraction. The intensity of a diffraction peak appearing in the region near 2θ=16 to 16.5° in the wide-angle X-ray diffraction image was plotted on the vertical axis. Then, provided that the vertical direction of the peak is regarded as an azimuth angle of 0°, an azimuth angle from 0° to 360° was plotted on the horizontal axis. In this manner, a profile showing the dependency of the diffraction peak intensity upon the azimuth angle was obtained. In the profile, two maximum peaks were present at azimuth angles of 0° and 180°. The present ratio C of a crystal oriented in TD was 0.92 and the degree of orientation D of the crystal oriented in TD was 67%.

Example 2

An unstretched film was obtained in the same manner as in Example 1 except that the mixing ratio of the master batch (A-1-MB-1) of a component (A) used in Example 1 to the crystalline propylene based polymer of a component (B) used in Example 1, that is, (A-1-MB-1)/(crystalline propylene based polymer), was set to be 30/70 (weight ratio). Furthermore, the unstretched film was stretched in the same manner as in Example 1 to obtain a stretched film. The resultant stretched film had no problem in drawing out from a roll of the film and was satisfactorily handled. The evaluation results are shown in Table 1. The resultant stretched film was subjected to wide-angle X-ray diffraction. The intensity of a diffraction peak appearing in the region near 2θ=16 to 16.5° in the wide-angle X-ray diffraction image was plotted on the vertical axis. Then, provided that the vertical direction of the peak is regarded as an azimuth angle of 0°, an azimuth angle from 0° to 360° was plotted on the horizontal axis. In this manner, a profile showing the dependency of the diffraction peak intensity upon the azimuth angle was obtained. In the profile, two maximum peaks were present at azimuth angles of 0° and 180°. The present ratio C of a crystal oriented in TD was 0.91 and the degree of orientation D of the crystal oriented in TD was 63%.

Comparative Example 1

An unstretched film was obtained in the same manner as in Example 1 except that the mixing ratio of the master batch (A-1-MB-1) of a component (A) used in Example 1 to the crystalline propylene based polymer of a component (B) used in Example 1, that is, (A-1-MB-1)/(crystalline propylene based polymer), was set to be 5/95 (weight ratio). Furthermore, the unstretched film was stretched in the same manner as in Example 1 to obtain a stretched film. The resultant stretched film had no problem in drawing out from a roll of the film and was satisfactorily handled. The evaluation results are shown in Table 1. The resultant stretched film was subjected to wide-angle X-ray diffraction. The intensity of a diffraction peak appearing in the region near 2θ=16 to 16.5° in the wide-angle X-ray diffraction image was plotted on the vertical axis. Then, provided that the vertical direction of the peak is regarded as an azimuth angle of 0°, an azimuth angle from 0° to 360° was plotted on the horizontal axis. In this manner, a profile showing the dependency of the diffraction peak intensity upon the azimuth angle was obtained. In the profile, two maximum peaks were present at azimuth angles of 0° and 180°. The present ratio C of a crystal oriented in TD was 0.93 and the degree of orientation D of the crystal oriented in TD was 68%.

Comparative Example 2

An unstretched film was obtained in the same manner as in Example 1 except that the mixing ratio of the master batch (A-1-MB-1) of a component (A) used in Example 1 to the crystalline propylene based polymer of a component (B) used in Example 1, that is, (A-1-MB-1)/(crystalline propylene based polymer), was set to be 50/50 (weight ratio). Furthermore, the unstretched film was stretched in the same manner as in Example 1 to obtain a stretched film. The resultant stretched film was blocked and thus not drawn out from a roll of the film and physical properties of the stretched film were not evaluated. The evaluation results are shown in Table 1. The resultant stretched film was subjected to wide-angle X-ray diffraction. The intensity of a diffraction peak appearing in the region near 2θ=16 to 16.5° in the wide-angle X-ray diffraction image was plotted on the vertical axis. Then, provided that the vertical direction of the peak is regarded as an azimuth angle of 0°, an azimuth angle from 0° to 360° was plotted on the horizontal axis. In this manner, a profile showing the dependency of the diffraction peak intensity upon the azimuth angle was obtained. In the profile, two maximum peaks were present at azimuth angles of 0° and 180°. The present ratio C of a crystal oriented in TD was 0.90 and the degree of orientation D of the crystal oriented in TD was 62%.

Example 3

[Production 2 of master batch of component (A): amorphous or low crystalline olefin based polymer] The amorphous propylene-1-butene copolymer (70 parts by weight) produced in the above, 30 parts by weight of a crystalline propylene based polymer (ethylene-propylene random copolymer, MFR=2.5 g/10 minutes, Tm=159° C., fusion heat of a crystal=90 J/g, the content of a monomer unit derived from ethylene=0.75 mol %), 0.2 parts by weight of a hindered phenol-based antioxidant ("Irganox1010" manufactured by Ciba Speciality Chemicals) and 0.2 parts by weight of an aromatic phosphite-based antioxidant ("Irgafos168" manufactured by Ciba Speciality Chemicals) were mixed. Next, to the mixture (100.4 parts by weight), 0.3 parts by weight of a peroxide ("Perhexa 25B-8" manufactured by NOF Corporation) was mixed, and melted and kneaded by a double screw extruder at 230° C. The MFR of master batch (A-1-MB-2) of the resultant component (A) was 3.0 g/10 minutes.

As the crystalline propylene based polymer of a component (B), 85 parts by weight of the ethylene-propylene random copolymer (MFR=2.5 g/10 minutes, Tm=159° C., fusion heat of a crystal=90 J/g, the content of monomer unit derived from ethylene=0.7 mol %) used in the above master batch (A-1-MB-2) and 15 parts by weight of the master batch (A-1-MB-2) of a component (A) obtained above were blended in the state of pellet and thereafter, extruded by a 45 mm φ double screw extruder at a resin temperature of 230° C. to obtain a raw material pellet (2). The raw material pellet (2) was melted/kneaded in a 50 mm φ extruder adjusted to a temperature of 230° C., extruded from a T-shaped die of 450 mm in width adjusted to a temperature of 250° C. in the form of film and cooled by a cooling roll adjusted to 20° C. The both side-edges of the film were cut off to obtain an unstretched film of 220 mm in width. The thickness of the unstretched film obtained was 120 μm. Furthermore, the unstretched film was stretched in the same manner as in Example 1 except that the stretching temperature was set to be 156° C. to obtain a stretched film. The resultant stretched film had no problem in drawing out from a roll of the film and was satisfactorily handled. The evaluation results are shown in Table 1. The resultant stretched film was subjected to wide-angle X-ray diffraction. The intensity of a diffraction peak appearing in the region near 2θ=16 to 16.5° in the wide-angle X-ray diffraction image was plotted on the vertical axis. Then, provided that the vertical direction of the peak is regarded as an azimuth angle of 0°, an azimuth angle from 0° to 360° was plotted on the horizontal axis. In this manner, a profile showing the dependency of the diffraction peak intensity upon the azimuth angle was obtained. In the profile, two maximum peaks were present at azimuth angles of 0° and 180°. The present ratio C of a crystal oriented in TD was 0.92 and the degree of orientation D of the crystal oriented in TD was 65%.

TABLE 1

|  | Example 1 | Example 2 | Comparative Example 1 | Comparative Example 2 | Example 3 |
|---|---|---|---|---|---|
| Component (A) (wt %) | 10.5 | 21 | 3.5 | 35 | 10.5 |
| Component (B) (wt %) | 89.5 | 79 | 96.5 | 65 | 89.5 |
| Stretch temperature (° C.) | 134 | 134 | 134 | 134 | 156 |
| Thickness of stretched film d (μm) | 18 | 18 | 19 | 17 | 21 |
| In-plane phase difference (Ro) average value (nm) | 910 | 750 | 1010 | Not measured | 880 |
| In-plane phase difference (Ro) standard deviation (nm) | 69 | 56 | 105 | Not measured | 80 |
| Variation of phase difference (%) | 7.6 | 7.5 | 10.3 | Not measured | 9.1 |
| Present ratio C of TD-oriented crystal (—) | 0.92 | 0.91 | 0.93 | 0.90 | 0.92 |
| Degree of orientation in TD D (%) | 67 | 63 | 68 | 62 | 65 |
| Handling | Good | Good | Good | No good | Good |

Example 4

Figure 3:
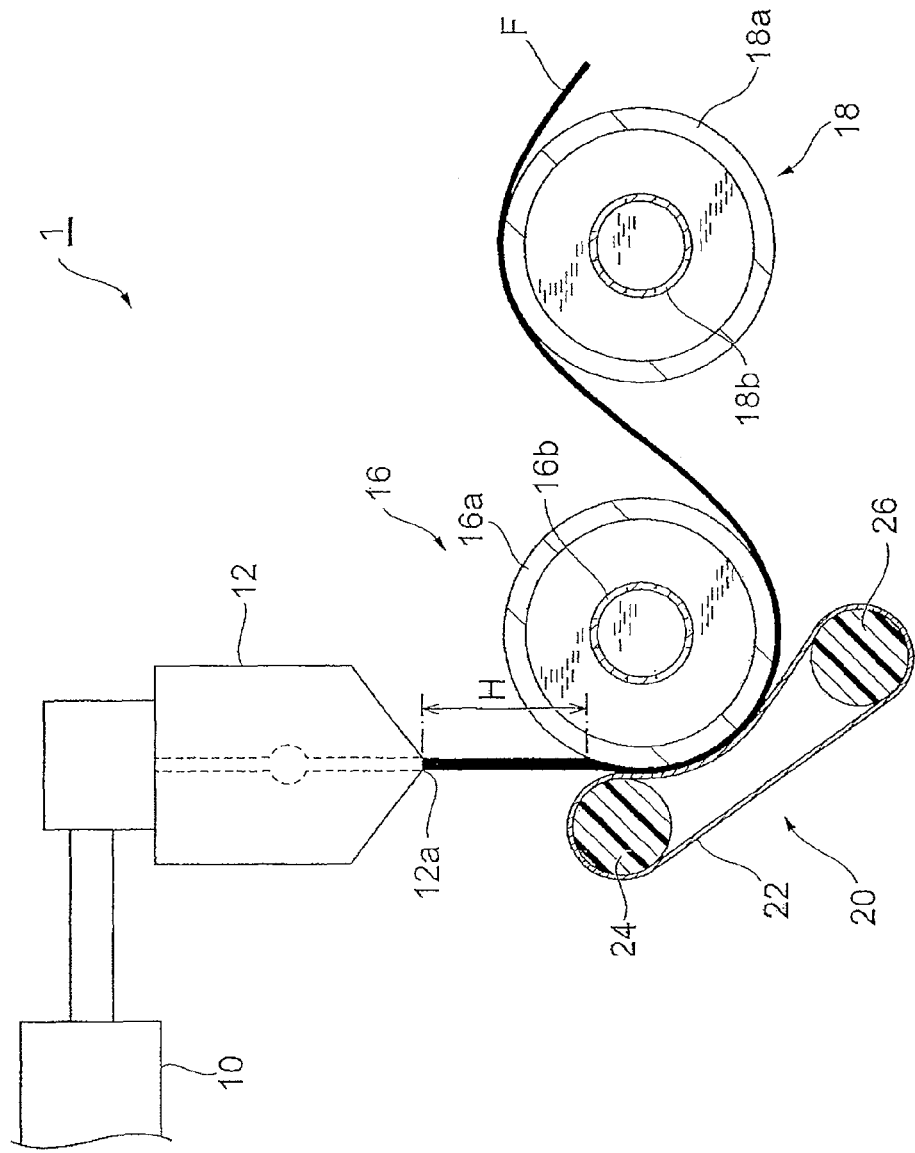
FIG. 3 is a schematic illustration of an apparatus for manufacturing an unstretched film used in Example 4.

Thirty parts by weight of the master batch (A-1-MB-1) of a component (A) used in Example 1 and 70 parts by weight of the crystalline propylene based polymer of a component (B) used in Example 1 were blended in the state of pellet and thereafter, extruded by a 45 mm φ double screw extruder at a resin temperature of 230° C. to obtain a raw material pellet (2). The content of the component A in the raw material pellet (2) was 21 wt %. Subsequently, as shown in FIG. 3, the raw material pellet (2) was loaded in a 75 mm φ extruder 10 adjusted to a temperature of 240° C., melted and kneaded and extruded in an extrusion amount of 100 kg/h from a T-shaped die 12 of 1200 mm in width adjusted to a temperature of 250° C. in the form of film. The extruded molten sheet F was cooled by nipping it between a cooling roll 16 of 400 mm φ adjusted to a temperature of 13° C., and a touch roll 20 comprising a metal sleeve (outer cylinder) 22 adjusted to a temperature of 13° C. and elastic rolls 24, 26 present therein, while applying a linear pressure of 10N/mm to obtain an unstretched film having a thickness of 130 μm and a width of 900 mm. The length of air-gap H (the length of a molten resin from an ejection port 12a of the T-shaped die 12 to a portion at which the molten resin is nipped between the touch roll 20 and the cooling roll 16) was 150 mm, the distance of the molten resin conveyed while being nipped between the cooling roll 16 and the touch roll 20 was 10 mm.

The metal sleeve (outer cylinder) 22 used herein had a diameter of 280 mm, assuming that it was a cylinder, a thickness of 300 μm and a surface roughness of 0.2 S. The surface was just like a mirror. The elastic roll 24 present inside was formed of silicone and the roll 26 was a metal roll. These rollers both had a diameter of 160 mm. The roll 24 had a degree of hardness of 60. The cooling roll 16 has a surface roughness of 0.1 S. The surface thereof was just like a mirror. Furthermore, the rotation rate of the touch roll 20 was set to be 30 m/min and the rotation rate of the cooling roll 16 was set to be 30 m/min.

Note that the cooling roll 16 had a metallic outer cylinder 16a, a fluid-containing cylindrical shaft 16b arranged within the metallic outer cylinder 16a, and fluid L (heat medium, oil) filling the space between the metallic outer cylinder 16a and the fluid-containing cylindrical shaft 16b and within the fluid-containing cylindrical shaft 16b, and a temperature controlling means (not shown) for controlling the temperature of fluid L. A cooling roll 18 arranged downstream had a metallic outer cylinder 18a, a fluid-containing cylindrical shaft 18b arranged within the metallic outer cylinder 18a, fluid L filling the space between the metallic outer cylinder 18a and the fluid-containing cylindrical shaft 18b and within the fluid-containing cylindrical shaft 18b, and a temperature controlling means (not shown) for controlling the temperature of fluid L. The cooling roll 18 had a diameter of 400 mm and a surface roughness of 0.2 S, like a mirror.

Figure 4:
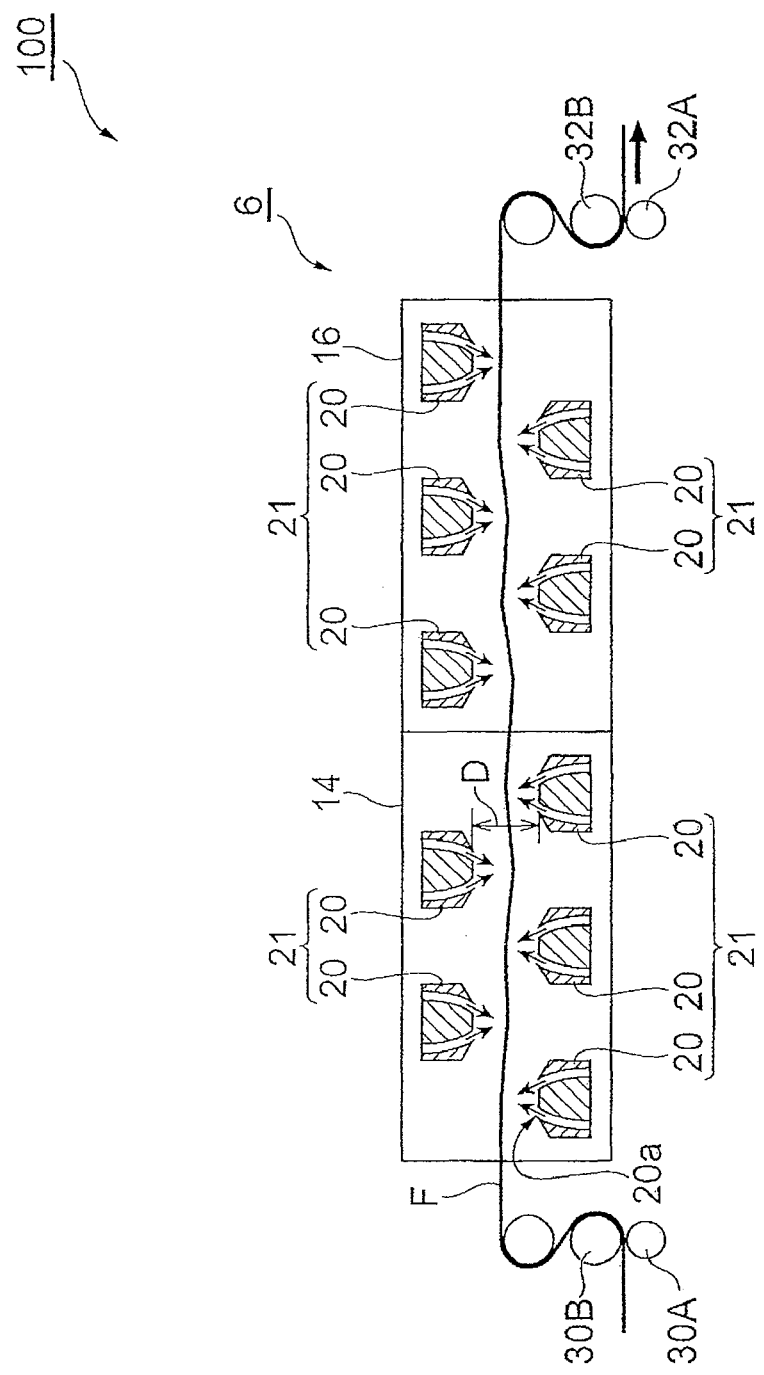
FIG. 4 is a schematic view of a long-span longitudinal stretching machine used in Example 4.

The unstretched film F was introduced into a long-span longitudinal stretching machine 100 (shown in FIG. 4) having an air-floating system oven 6 arranged between two pairs of nip rolls and longitudinally stretched. The air-floating system oven was divided into two zones 14, 16 each having a length of 2.5 m and having 5 pairs of nozzles 20. A pair of nozzle rows 21, 21 each having a plurality of nozzles 20 are arranged so as to face each other with the film F (made of a thermoplastic resin) interposed between them. In the nozzle rows 21 (facing each other), the nozzles 20 were arranged in a zigzag fashion, more specifically, the nozzles 20 are arranged along the longitudinal direction (moving direction) of the thermoplastic resin film F so as not to face to each other.

Figure 5:
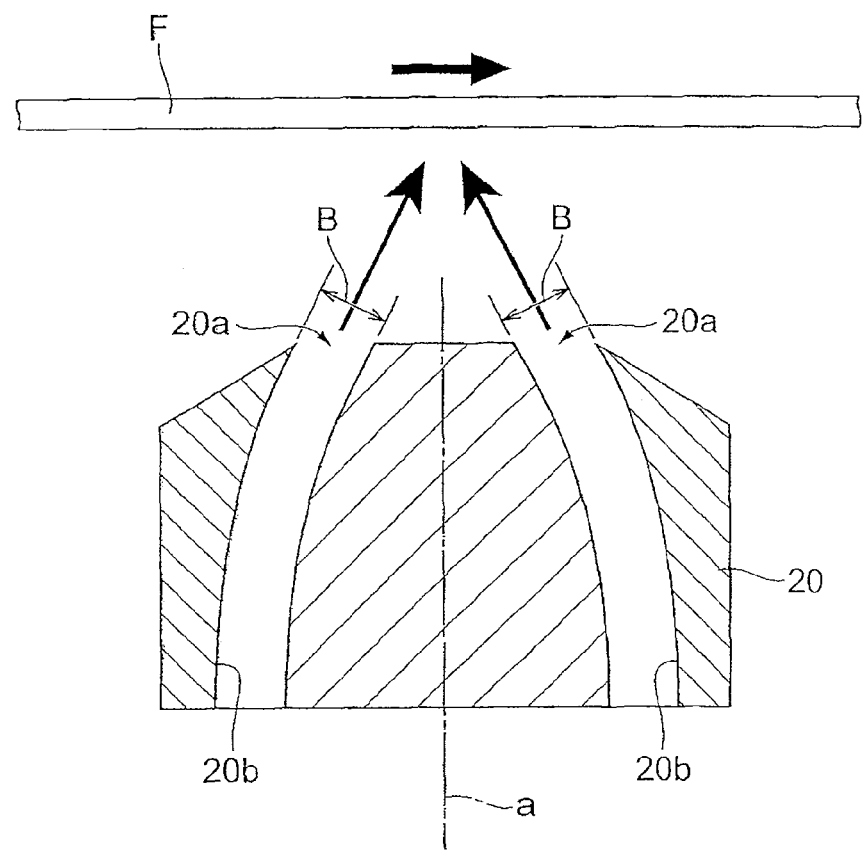
FIG. 5 is an enlarged sectional view of the nozzle of FIG. 4.

Furthermore, as shown in FIG. 5, each nozzle 20 had a pair of slits 20a (serving as a hot-air blowout port in the tip), which are arranged along a longitudinal direction of the film at a distance from the symmetric axis a of the nozzle 20 with the symmetric axis interposed between them. Furthermore, each slit 20a extended in the width direction of the thermoplastic resin film (direction perpendicular to the plane of paper in FIG. 5) and had an opening at the top. A channel 20b, which supplies hot air to each slit 20a, was formed such that it extended from a position apart from the symmetric axis a and curved toward the symmetric axis and reached the slit 20a. Hot air discharged from each of the slits 20a bent toward the symmetric axis. These two gas streams were merged and blown to the film F substantially perpendicularly. Note that the symmetric axis a was arranged substantially in perpendicular to the film F.

Furthermore, in the plane perpendicular to the length direction of the slit 20a (the direction perpendicular to the plane of paper of FIG. 5), the width of an opening of the slit 20a in the direction perpendicular to the direction, along which a gas was brown out from the slit 20a, was defined as slit width B. The air supply rate A of the hot air supplied from each slit 20a of the nozzle 20 was 10 m/s, the slit width B of each slit of the nozzle was $4 \times 10^{-3}$ m, and the interval D between upper nozzles and lower nozzles was 100 mm. A single nozzle 20 had two slits 20a having slit width B. As conditions for longitudinal stretching, the temperature of a first zone 14 was set to be 118° C. and the temperature of a second zone 16 was set to be 122° C. Furthermore, the rotation rate of nip rolls 32A, 32B near the outlet was set to be faster than the rotation rate of nip rolls 30A, 30B near the inlet, thereby applying stress to the film F in the longitudinal direction. In this manner, the thermoplastic resin film heated was longitudinally stretched. The inlet speed of the film F was set to be 6 m/minute; the outlet speed was set to be 12 m/minute; and a stretching ratio was set to be two fold.

During a longitudinal stretching process performed in the conditions, the film floated in the air nearly in the middle between the upper and lower nozzles without being in contact with the nozzles and maintained a normal floating state. The thickness of the longitudinally stretched film (longitudinal stretched) was 90 μm and the width thereof was 700 mm. The longitudinally stretched film was measured for in-plane phase difference $R_O$ and thickness-direction phase difference $R_{th}$ at a single position of the center portion in the width direction.

As a result, the in-plane phase difference $R_O$ was 1000 nm and the thickness-direction phase difference $R_{th}$ was 520 nm.

Next, the longitudinally stretched film was transversely stretched by a tenter method to prepare a retardation film. The oven to be used in the tenter method had a pre-heating zone, a stretching zone and a heat setting zone in this order from the upstream (the inlet of the oven) side in the film flowing direction. The length of the pre-heating zone along the film flowing direction was 1.5 m, the length of the stretching zone was 3.0 m and the length of heat setting zone was 1.5 m (the whole length of the oven: 6.0 m).

Figure 6:
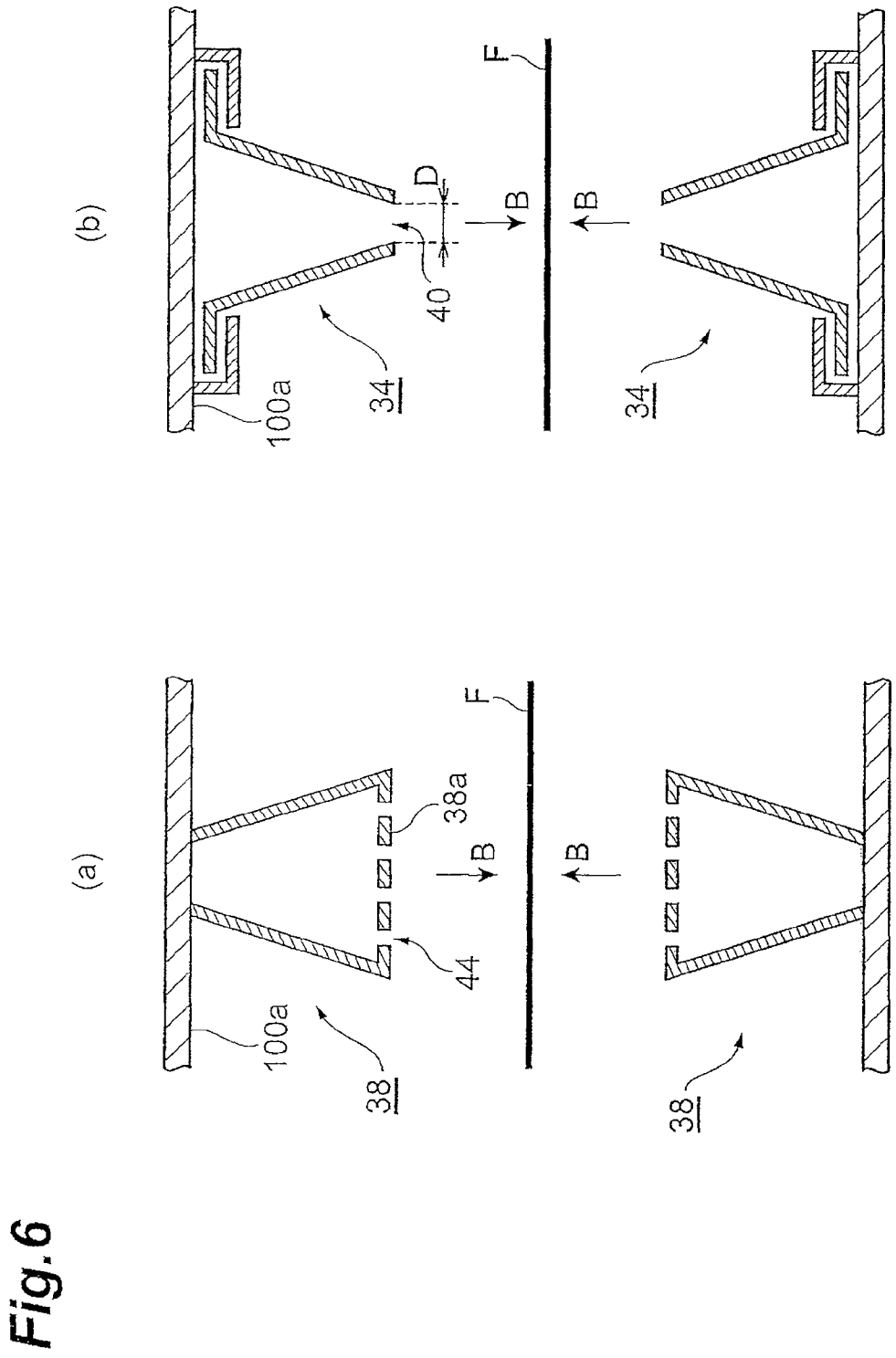
In FIG. 6 shows.

As a hot-air blowout nozzle of the tenter oven, a punching nozzle was used. A punching nozzle 38 was formed on upper and lower surfaces of the oven, as shown in FIG. 6 (*a*) and constructed so as to blow hot air substantially in perpendicular (direction indicated by an arrow B) to the film F horizontally conveyed. The cross section of the nozzle was a trapezoid gradually spreading wide toward the plane 38a facing to the film 25. The punching nozzle 38 had a plurality of circler openings 44 in the lower plane 38a facing the film. The hot-air blowout port of the punching nozzle 38 consisted of a plurality of openings 44 formed in the plane 38a. The openings 44 served as a port for blowing hot air. Hot air was brown out from the openings 44 at a predetermined air supply rate. The openings 44 were arranged along not only the longitudinal direction of the film 25 but also the width direction in a zigzag fashion.

The length of the punching nozzle 38 in the width direction of the film was 1600 mm. The circular opening of the punching nozzle had a diameter of 5 mm. The total area of the openings 44 of each punching nozzle 38 per meter of the film-width direction, in other words, the area of the blowout ports was 0.011 m².

The transverse stretching by a tenter method was performed by passing a film horizontally in the middle space of the oven. More specifically, transverse stretching was performed in the conditions: the preheat temperature of the pre-heating zone: 134° C., the stretching temperature of the stretching zone: 132° C., the heat setting temperature of the heat setting zone: 130° C., the transverse stretching ratio: 4.2 fold, the line speed: 3 m/minute and the distance between chucks at the outlet of the oven: 1514 mm. As a result, a retardation film was obtained. Note that the line speed mentioned above is a moving speed of a film within the oven.

Furthermore, at this time, the supply rate of hot air brown out from a blowout port of each punching nozzle 38 was set to be 13 m/second and the amount of hot air brown out from each punching nozzle 38 to the film per meter in the film-width direction was set to be 0.143 m³/second. Note that the supply rate and amount of hot air were measured by the following method.

<Measurement for Supply Rate and Amount of Hot Air>

The supply rate of air brown out from the punching nozzle 38 was measured as follows. In each of the upper and lower nozzles arranged around the center of each zone in the film-feed direction relative to the film moving direction, a pair of points were defined at a distance of 100 mm from both ends of each nozzle toward the center in the film-width direction (depth direction) and the interval between the pair of points was partitioned into four portions to define further three partition points. At these five points in total, the supply rate of hot air was measured by a hot air anemometer. To describe more specifically, in each zone, the supply rate of hot air each from an upper nozzle and a lower nozzle was measured at 10 points in total by a commercially available hot air anemometer. Subsequently, an average value of these was obtained and regarded as the supply rate of hot air from the blowout port of each nozzle. The amount of hot air brown out was obtained by multiplying the area of the blowout port by the supply rate of hot air obtained as described above.

The in-plane phase difference value $R_0$ of the retardation film was measured in the center portion in the width direction, more specifically, measured in the portion having a length of 760 mm (corresponding to a half of the film width) at intervals of 1.5 mm in the width direction. An average value and a standard deviation were obtained by calculation. The $R_0$ average value was 73 nm and variation of phase difference was 11%. High optical homogeneity was obtained. The thickness-direction phase difference $R_{th}$ of the center of the retardation film in the width direction was 120 nm and the thickness thereof was 16 μm. Furthermore, variation of the optical axis was 3.3°. High optical homogeneity was obtained. The resultant retardation film was subjected to wide-angle X-ray diffraction. The intensity of a diffraction peak appearing in the region near $2\theta=16$ to $16.5°$ in the wide-angle X-ray diffraction image was plotted on the vertical axis. Then, provided that the vertical direction of the peak is regarded as an azimuth angle of 0°, an azimuth angle from 0° to 360° was plotted on the horizontal axis. In this manner, a profile showing the dependency of the diffraction peak intensity upon the azimuth angle was obtained. In the profile, four maximum peaks were present at azimuth angles of 0°, 90°, 180° and 270°. The present ratio C of a crystal oriented in TD was 0.80 and the degree of orientation D of the crystal oriented in TD was 88%. Furthermore, the resultant retardation film had no problem in drawing out from a roll of the film and was satisfactorily handled.

Subsequently, a corona discharge treatment was applied to the surface of the retardation film.

<Preparation of Composite Polarizing Plate>

A polarizer was prepared, which was formed of a polyvinyl alcohol film to which iodine molecules were aligned by adsorption. To one of the surfaces of the polarizer, the retardation film was attached such that a corona discharged surface thereof was allowed to face the polarizer. To the other surface of the polarizer, a triacetylcellulose film whose surface was modified by a saponification treatment was attached. The attachment to both surfaces was made via an adhesive, which is an aqueous solution of a water soluble polyamide epoxy resin (Sumirez resin 650, Sumitomo Chemical Co., Ltd.) and polyvinyl alcohol. Thereafter, the construct was dried at 80° C. for 5 minutes and further allowed to cure at 40° C. for about 72 hours to prepare a composite polarizing plate.

<Evaluation of Composite Polarizing Plate>

A liquid crystal television "BRAVIA KDL-32S1000" manufactured by SONY Corporation was decomposed and upper and lower polarizing plates were removed from liquid crystal cells. In place of the polarizing plates installed in the product, the composite polarizing plates obtained above were attached via a pressure sensitive adhesive, which was applied to each of the retardation films. The television was reassembled and backlight was turned on. The front-face contrast was measured by a liquid crystal view angle measurement apparatus "EZ Contrast 160R" manufactured by ELDIM Corporates. The front-face contrast was 1500. Since front-face contrast value was large, the color of the screen displayed in the liquid crystal display device looked brighter. The retardation film was satisfactory.

Example 5

An unstretched film was obtained in the same manner as in Example 4 except that the thickness of the unstretched film was set to be 50 μm. Next, the unstretched film was transversely stretched by a tenter method to prepare a retardation film. The oven to be used in the tenter method had a preheating zone, a stretching zone and a heat setting zone in this order from the upstream (the inlet of the oven) side of the film flowing direction. The length of the pre-heating zone in the machine direction was 4 m, the length of the stretching zone was 8 m and the length of heat setting zone was 4 m (the whole length of the oven: 16 m). As the nozzle for blowing out hot air of the tenter oven, a jet nozzle was used. The jet nozzle had a taper slit 40 extending in the width direction as shown in FIG. 6 (b) as a hot-air blowout port. The length of the jet nozzle 34 in the film-width direction was 2500 mm. The width D of the slit 40 of each jet nozzle 34 was 5 mm. The area of the slits 40 per nozzle and per meter in film-width direction, in other words, the area of blow-out port was 0.005 m². Transverse stretching was performed in the conditions: the preheat temperature of the pre-heating zone: 136° C., the stretching temperature of the stretching zone: 126° C., the heat setting temperature of the heat setting zone: 100° C., the blow-out rate of a hot air from a blowout port of each jet nozzle 34 was 15 m/second, the amount of air blown out form each jet nozzle 34 per meter in the film-width direction was 0.075 m³/second, the transverse stretching ratio: 4.0 fold, the line speed: 4 m/minute and the distance between chucks at the outlet of the oven: 2200 mm. As a result, a retardation film called a ¼ wavelength plate was obtained.

The in-plane phase difference value $R_0$ of the retardation film was measured in the center portion in the width direction, more specifically, measured in the portion having a length of 1100 mm (corresponding to a half of the film width) at intervals of 1.5 mm in the width direction. An average value and a standard deviation were obtained by calculation. The $R_0$ average value was 90 nm and the variation of phase difference was 0.2%. High optical homogeneity was obtained. The thickness-direction phase difference $R_{th}$ of the center of the retardation film in the width direction was 45 nm and the thickness thereof was 10 μm. Furthermore, the variation of the optical axis was 1.0°. High optical homogeneity was obtained. The resultant retardation film was subjected to wide-angle X-ray diffraction. The intensity of a diffraction peak appearing in the region near $2\theta=16$ to $16.5°$ in the wide-angle X-ray diffraction image was plotted on the vertical axis. Then, provided that the vertical direction of the peak is regarded as an azimuth angle of 0°, an azimuth angle from 0° to 360° was plotted on the horizontal axis. In this manner, a profile showing the dependency of the diffraction peak intensity upon the azimuth angle was obtained. In the profile, two maximum peaks were present at azimuth angles of 0° and 180°. The present ratio C of a crystal oriented in TD was 0.93 and the degree of orientation D of the crystal oriented in TD was 69%. Furthermore, the resultant retardation film had no problem in drawing out from a roll of the film and was satisfactorily handled.

Example 6

An unstretched film was obtained in the same manner as in Example 4 except that the thickness of the unstretched film was set to be 80 μm. Next, the unstretched film was transversely stretched by a tenter method in the same manner as in Example 5 except that the preheat temperature of the pre-heating zone was set to be 130° C. and the stretching temperature of the stretching zone was set to be 120° C., to prepare a retardation film generally called a ½ wavelength plate.

The in-plane phase difference value $R_0$ of the retardation film was measured in the center portion in the width direction, more specifically, measured in the portion having a length of 1100 mm (corresponding to a half of the film width) at intervals of 1.5 mm in the width direction. An average value and a standard deviation were obtained by calculation. The $R_0$ average value 270 nm and the variation of phase difference was 0.3%. High optical homogeneity was obtained. The thickness-direction phase difference $R_{th}$ of the center of the retardation film in the width direction was 135 nm and the thickness thereof was 20 µm. Furthermore, the variation of the optical axis was 1.6°. High optical homogeneity was obtained. The resultant retardation film was subjected to wide-angle X-ray diffraction. The intensity of a diffraction peak appearing in the region near 2θ=16 to 16.5° in the wide-angle X-ray diffraction image was plotted on the vertical axis. Then, provided that the vertical direction of the peak is regarded as an azimuth angle of 0°, an azimuth angle from 0° to 360° was plotted on the horizontal axis. In this manner, a profile showing the dependency of the diffraction peak intensity upon the azimuth angle was obtained. In the profile, two maximum peaks were present at azimuth angles of 0° and 180°. The present ratio C of a crystal oriented in TD was 0.98 and the degree of orientation D of the crystal oriented in TD was 78%. Furthermore, the resultant retardation film had no problem in drawing out from a roll of the film and was satisfactorily handled.

Comparative Example 3

An unstretched film was obtained in the same manner as in Example 4 except that the mixing ratio of the master batch (A-1-MB-1) of a component (A) used in Example 4 to the crystalline propylene based polymer of a component (B) used in Example 4, that is, (A-1-MB-1)/(crystalline propylene based polymer) was set to be 5/95 (weight ratio) and the thickness of the unstretched film was set to be 100 µm. The content of the component A in the raw material pellet was 3.5 wt %.

Next, the unstretched film was longitudinally stretched in the same manner as in Example 4 to obtain a longitudinally stretched film. During a longitudinal stretching process performed in the conditions, the film was floated in the air nearly in the middle between the upper and lower nozzles without being in contact with the nozzles and maintained a normal floating state. The thickness of the longitudinally stretched film (longitudinal stretched) was 70 µm and the width thereof was 700 mm. The longitudinally stretched film was measured for thickness-direction phase difference $R_{th}$ at a single position of the center portion in the width direction. As a result, the in-plane phase difference $R_0$ was 830 nm and the thickness-direction phase difference $R_{th}$ was 430 nm.

Next, the longitudinally stretched film was transversely stretched by a tenter method in the same manner as in Example 4 except that the preheat temperature of the preheating zone was set to be 136° C., the stretching temperature of the stretching zone was set to be 126° C., the heat setting temperature of the heat setting zone was set to be 126° C., the transverse stretching ratio was set to be 3.5 fold, the line speed was set to be 3 m/minute and the distance between chucks at the outlet of the oven was set to be 1257 mm to prepare a retardation film.

The in-plane phase difference value $R_0$ of the retardation film was measured in the center portion in the width direction, more specifically, measured in the portion having a length of 630 mm (corresponding to a half of the film width) at intervals of 1.5 mm in the width direction. An average value and a standard deviation were obtained by calculation. The $R_0$ average value was 74 nm and the variation of phase difference was 18%. The optical homogeneity was low compared to Example 4 and unsatisfactory as a retardation film put in use. The thickness-direction phase difference $R_{th}$ of the center of the retardation film in the width direction was 110 nm and the thickness thereof was 15 µm. Furthermore, the variation of the optical axis was 9.5°. The optical homogeneity was low and unsatisfactory as a retardation film put in use. The resultant retardation film was subjected to wide-angle X-ray diffraction. The intensity of a diffraction peak appearing in the region near 2θ=16 to 16.5° in the wide-angle X-ray diffraction image was plotted on the vertical axis. Then, provided that the vertical direction of the peak is regarded as an azimuth angle of 0°, an azimuth angle from 0° to 360° was plotted on the horizontal axis. In this manner, a profile showing the dependency of the diffraction peak intensity upon the azimuth angle was obtained. In the profile, four maximum peaks were present at azimuth angles of 0°, 90°, 180° and 270°. The present ratio C of a crystal oriented in TD was 0.82 and the degree of orientation D of the crystal oriented in TD was 90%. Furthermore, the resultant retardation film had no problem in drawing out from a roll of the film and was satisfactorily handled.

The results of Examples 4 to 6, Comparative Example 3 are shown in Table 2.

TABLE 2

|  | Example 4 | Example 5 | Example 6 | Comparative Example 3 |
|---|---|---|---|---|
| Component (A) (wt %) | 21 | 21 | 21 | 3.5 |
| Component (B) (wt %) | 79 | 79 | 79 | 96.5 |
| Stretching method | Biaxial stretching | Transverse stretching | Transverse stretching | Biaxial stretching |
| Thickness of stretched film d (µm) | 16 | 10 | 20 | 15 |
| In-plane phase difference ($R_0$) average value (nm) | 73 | 90 | 270 | 74 |
| Thickness-direction phase difference ($R_{th}$) | 120 | 45 | 135 | 110 |
| Variation of phase difference (%) | 11 | 0.2 | 0.3 | 18 |
| Variation of the optical axis (°) | 3.3 | 1.0 | 1.6 | 9.5 |
| Present ratio C of TD-oriented crystal (—) | 0.80 | 0.93 | 0.98 | 0.82 |
| Degree of orientation in TD D (%) | 88 | 69 | 78 | 90 |
| Handling | Good | Good | Good | Good |

The invention claimed is:

1. An optical film comprising at least one layer formed of a polyolefin based resin composition containing 8 to 30 wt % of a component (A) defined below and 92 to 70 wt % of a component (B) defined below, with the proviso that a total of the component (A) and the component (B) is 100 wt %:

component (A): an olefin based polymer with which neither a crystal fusion peak having a crystal fusion heat of 30 J/g or more nor a crystallization peak having a crystallization heat of 30 J/g or more to be observed in the range of −50 to 200° C. is observed in a differential scanning calorimetry measurement according to JIS K 7122; and component (B): a propylene based polymer with which a crystal fusion peak having a crystal fusion heat larger than 30 J/g or a crystallization peak having a crystallization heat larger than 30 J/g to be observed in the range of −50 to 200° C. is observed in a differential scanning calorimetry measurement according to JIS K 7122.

2. The optical film according to claim 1, wherein the component (A) is a polymer satisfying the following formula (1):

$$0 \leq [x/(x+y)] < 0.6 \quad (1)$$

(in the above formula (1), x represents a content (% by mole) of a monomer unit derived from ethylene in the component (A), and y represents a content (% by mole) of a monomer unit derived from an α-olefin having 4 to 20 carbon atoms in the component (A), with the proviso that a total amount of the component (A) is 100% by mole).

3. The optical film according to claim 1, wherein the component (A) is an olefin based polymer with which neither a crystal fusion peak having a crystal fusion heat of 1 J/g or more nor a crystallization peak having a crystallization heat of 1 J/g or more to be observed in the range of −50 to 200° C. is observed in a differential scanning calorimetry measurement according to JIS K 7122.

4. The optical film according to claim 1, wherein the component (B) is a propylene based polymer having a melting point of 145° C. or less.

5. The optical film according to claim 1, which has been stretched at least uniaxially.

6. The optical film according to claim 1 which is a retardation film.

7. The optical film according to claim 1 which has a present ratio C of a crystal oriented in a film-width direction being 0.75 or more and 0.85 or less and a degree of orientation D of the crystal oriented in the film-width direction being 80% or more and 95% or less, which are determined from a diffraction peak observed in a region near 2θ=16 to 16.5° in a wide-angle X-ray diffraction image.

8. The optical film according to claim 1 which has a present ratio C of a crystal oriented in a film-width direction being 0.90 or more and 1.00 or less and a degree of orientation D of the crystal oriented in the film-width direction being 60% or more and 85% or less, which are determined from a diffraction peak observed in a region near 2θ=16 to 16.5° in a wide-angle X-ray diffraction image.

* * * * *